United States Patent [19]

Iwakura et al.

[11] Patent Number: 5,638,478
[45] Date of Patent: Jun. 10, 1997

[54] OPTICAL FIBER CABLE HAVING A GROOVED SPACER FORMED WITH ONE OR MORE SZ-SPIRAL GROOVES ON ITS OUTER CIRCUMFERENCE ALONG THE LONGITUDINAL DIRECTION OF THE SPACER THE INVERTING ANGLE OF EACH GROOVE BEING AT LEAST 180°

[75] Inventors: Daisuke Iwakura; Akihiro Otake, both of Tokyo; Kazuo Hogari, Tokai-mura; Shigekazu Hayami, Mito; Shigeru Tomita, Tokyo-to, all of Japan

[73] Assignees: The Furukawa Electric Co., Ltd.; Nippon Telegraph and Telephone Corporation, both of Tokyo, Japan

[21] Appl. No.: 499,046

[22] Filed: Jul. 6, 1995

[30] Foreign Application Priority Data

| Jul. 6, 1994 | [JP] | Japan | 6-176153 |
| Nov. 30, 1994 | [JP] | Japan | 6-319485 |
| May 26, 1995 | [JP] | Japan | 7-128666 |

[51] Int. Cl.⁶ ............................. G02B 6/44
[52] U.S. Cl. ............ 385/111; 385/104; 385/114
[58] Field of Search ................ 385/100, 104, 385/105, 110, 111, 114

[56] References Cited

U.S. PATENT DOCUMENTS

| 4,205,899 | 6/1980 | King et al. ............ 385/111 X |
| 4,474,426 | 10/1984 | Yataki ..................... 385/111 |
| 4,820,014 | 4/1989 | Nishimura et al. ........ 385/105 |
| 4,828,352 | 5/1989 | Kraft ..................... 385/111 X |
| 5,082,380 | 1/1992 | Sutehall et al. .......... 385/114 |
| 5,193,134 | 3/1993 | Pizzorno et al. .......... 385/105 |

FOREIGN PATENT DOCUMENTS

| 0280279 | 8/1988 | European Pat. Off. . |
| 0392827 | 10/1990 | European Pat. Off. . |
| 0394618 | 10/1990 | European Pat. Off. . |
| 61-53612 | 3/1986 | Japan ..................... 385/105 |
| 1-147511 | 6/1989 | Japan ..................... 385/104 |
| 1-239513 | 9/1989 | Japan ..................... 385/105 |
| 2-83507 | 3/1990 | Japan . |
| 4-55803 | 2/1992 | Japan ..................... 385/114 |
| 5-203849 | 8/1993 | Japan . |

OTHER PUBLICATIONS

"Brillouin Characterization of Fiber Strain in Bent Slot-Type Optical-Fiber Cables"; Journal of Lightwave Technology (vol. 10., No. 9, Sep. 1992) Tsuneo Horiguchi et al.; pp. 1196–1201.

Patent Abstracts of Japan; Publication No. JP4055803; vol. 16; No. 247 Feb. 24, 1992 (1 page).

*Primary Examiner*—John D. Lee
*Attorney, Agent, or Firm*—Armstrong, Westerman Hattori, McLeland & Naughton

[57] ABSTRACT

An optical fiber cable provided with a grooved spacer having on its outer circumference at least one SZ-spiral groove formed continuously along its longitudinal direction and at least one optical fiber tape accommodated in the groove of the grooved spacer, wherein the inverting angle, showing the rotational angle in the circumferential direction of the grooved spacer from one inverting portion of the SZ-spiral groove of the grooved spacer to the next inverting portion, is at least 180° and wherein the optical fiber tape is accommodated in the groove in a state where the tape surface faces the bottom of the SZ-spiral groove at the center portions between inverting portions of the SZ-spiral groove and in a state where the tape side edges, which would be positioned at the inside of the bends of the groove of the inverting portions when assuming that the optical fiber tape were accommodated in the groove in a state where the tape surface faced the groove bottom at the inverting portions of the groove, face the groove bottom.

18 Claims, 16 Drawing Sheets

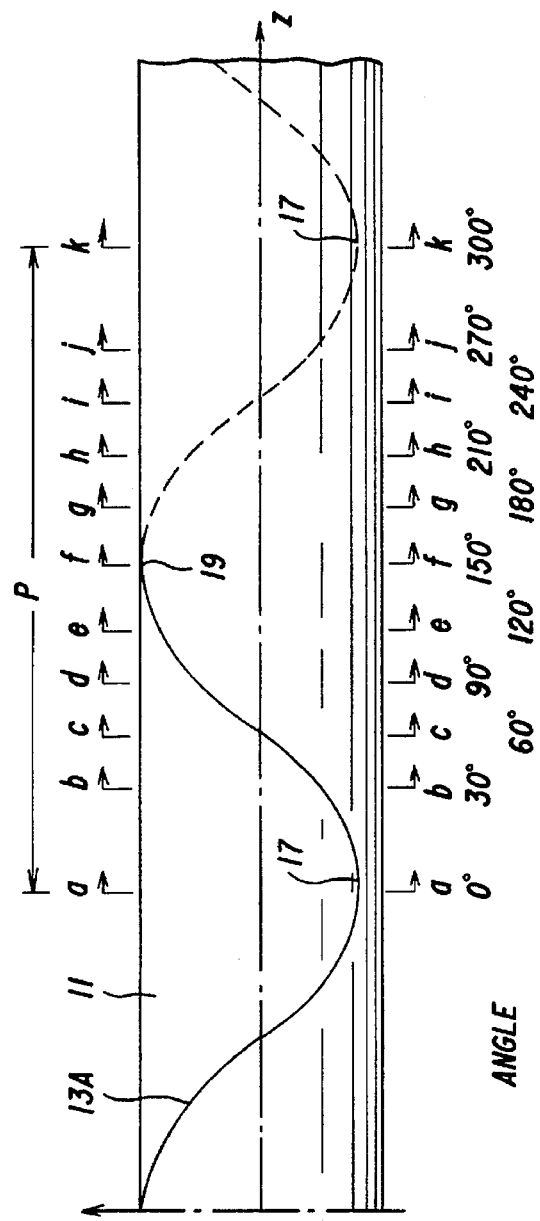
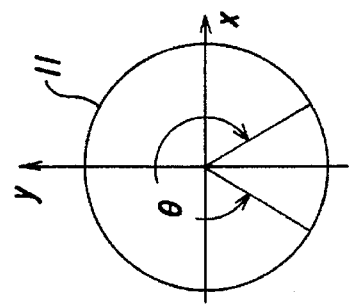

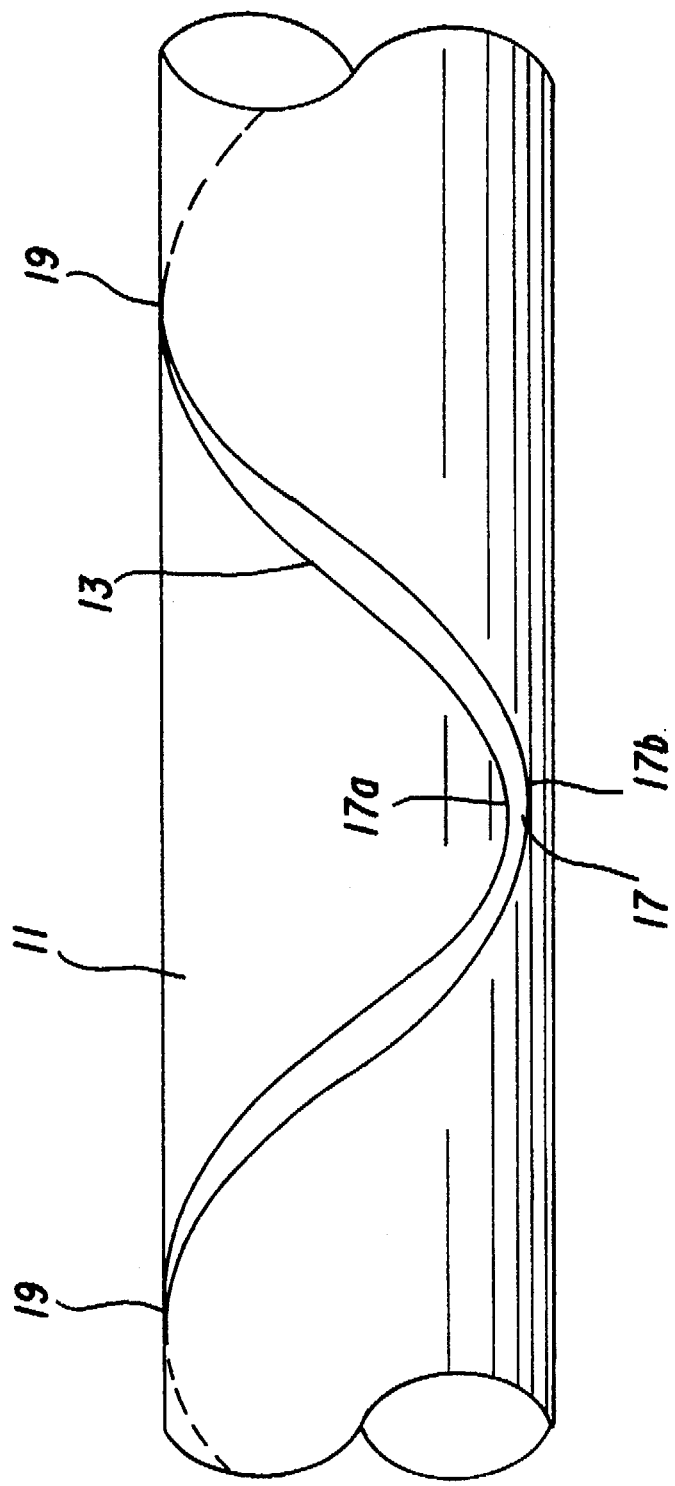

OPTICAL FIBER CABLE HAVING A GROOVED SPACER FORMED WITH ONE OR MORE SZ-SPIRAL GROOVES ON ITS OUTER CIRCUMFERENCE ALONG THE LONGITUDINAL DIRECTION OF THE SPACER THE INVERTING ANGLE OF EACH GROOVE BEING AT LEAST 180°

BACKGROUND ART

1. Technical Field

The present invention relates to an optical fiber cable. More particularly, the present invention relates to an optical fiber cable using a grooved spacer formed with SZ-spiral grooves, accommodating optical fiber tapes (ribbons), in its outer circumference along its longitudinal direction.

2. Description of the Related Art

An optical fiber is for example comprised of a fiber core, a cladding provided on the outer circumference of the core and plastic coating.

Such an optical fiber is in most cases used bundled with several other fibers in a tape form.

An optical fiber cable using a grooved spacer having SZ-spiral grooves in its outer circumference and accommodating optical fibers in those grooves is advantageous in that it is easy to take the optical fibers out from the grooves at the time of connection or terminal treatment. In this type of cable, the optical fibers used were optical fiber tapes. There have been known cables with a plurality of optical fiber tapes accommodated in the grooves stacked in the direction of depth of the grooves (Japanese Unexamined Patent Publication (Kokai) No. 2-83507 and Japanese Unexamined Patent Publication (Kokai) No. 5-203849) and cables with them accommodated in the grooves stacked in the width direction of the grooves (Japanese Unexamined Patent Publication (Kokai) No. 4-55803).

An SZ-spiral groove is formed continuously on the outer circumference of the spacer of the optical fiber cable in a periodically inverting wave shape along the longitudinal direction of the spacer. That is, the SZ-spiral groove is not formed as one-directional spiral groove (that is, an S-spiral type of Z-spiral type groove), but is formed in a wave shape periodically inverting along the outer circumference of the spacer. That is, the SZ-spiral groove periodically inverts in the direction of the spiral.

A spacer with such an SZ-spiral groove formed on its outer circumference has the advantage that it is easy to take out the optical fiber tape from the groove when making connections, performing terminal treatment, etc.

Japanese Unexamined Patent Publication (Kokai) No. 2-83507 and Japanese Unexamined Patent Publication (Kokai) No. 5-203849 disclose optical fiber cables where a number of optical fiber tapes are accommodated in grooves stacked in the direction of depth of the grooves.

Further, Japanese Unexamined Patent Publication (Kokai) No. 4-55803 discloses an optical fiber cable where optical fiber tapes are accommodated in an SZ-spiral groove with the optical fiber tapes stacked in the width direction (lateral direction) of the SZ-spiral groove.

An optical fiber tape is made by arranging a plurality of optical fibers in parallel on the same plane and then applying a common covering to form them into a tape shape. Therefore, when flexed in a direction causing the tape surface to bend, the individual optical fibers uniformly bend and therefore there is almost no increase in transmission loss. When flexed in a direction causing the side edges of the tape to bend in the plane of the tape (edgewise flexing), however, the optical fibers at the inside of the bend are subjected to strain in the compressive direction, while the optical fibers at the outside of the bend are subjected to strain in the tensile direction. This strain causes a large increase in transmission loss.

The occurrence of transmission loss will be explained in further detail here. If a groove for accommodating optical fiber tapes is formed as a one-directional spiral groove on the outer circumference of a spacer, the optical fiber tapes need only be accommodated so as to be wound around the cable in the one-directional spiral groove, so there is no large strain on the optical fiber tapes. If an SZ-spiral groove is formed in a wave shape on the outer circumference of the spacer, however, a plurality of optical fiber tapes are accommodated stacked in a certain direction with respect to the direction of the SZ-spiral groove, so there is always a portion to which a flexing motion in a direction causing the tape side edges to bend occurs in the optical fiber tapes. For example, in cables with the plurality of optical fiber tapes stacked in the depth direction of a groove as disclosed in Japanese Unexamined Patent Publication (Kokai) No. 2-83507 and Japanese Unexamined Patent Publication (Kokai) No. 5-203849, the optical fiber tapes mainly receive a flexing motion in a direction causing the tape side edges to bend at the inverting portions of the SZ-spiral groove. Further, in a cable with a plurality of optical fiber tapes stacked in the width direction of the groove as disclosed in Japanese Unexamined Patent Publication (Kokai) No. 4-55803, the tapes mainly receive a flexing motion in a direction causing the tape side edges to bend at the center portions between the inverting portions of the SZ-spiral groove (portions between one inverting portion and the next inverting portion). In both cases, transmission loss occurs.

In this way, an optical fiber cable of the type which uses a grooved spacer having an SZ-spiral groove and accommodating optical fiber tapes in those grooves is inevitably subjected to an excessive bending stress in the optical fiber tapes, so not only does the increase in the transmission loss of the optical fiber become greater, but also there is a problem in the point of the reliability in long-term use, thereby making commercial application difficult. An optical fiber cable having a spacer with an SZ-spiral groove, however, as mentioned above, has the advantage of easy removal of the optical fiber tapes from the groove at the time of connecting and terminal treatment of optical fiber tapes.

SUMMARY OF THE INVENTION

An object of the present invention, in consideration of the above problems, is to provide an optical fiber cable of the type which accommodates optical fiber tapes in an SZ-spiral groove of a grooved spacer wherein the occurrence of bending and strain of the optical fibers is prevented and the increase in the transmission loss can be made sufficiently small.

Another object of the present invention is to provide an optical fiber cable having a spacer with an SZ-spiral groove which enables reliability to be maintained over the long term.

According to the present invention, there is provided an optical fiber cable including a grooved spacer having on its outer circumference at least one SZ-spiral groove formed continuously along its longitudinal direction and at least one optical fiber tape accommodated in the groove of said grooved spacer, wherein (a) the inverting angle, showing the rotational angle in the circumferential direction of the grooved spacer from one inverting portion of the SZ-spiral groove of the grooved spacer to the next inverting portion, is at least 180° and (b) the optical fiber tape is accommodated in the groove in a state where the tape surface faces the bottom of the SZ-spiral groove at the center portions between inverting portions of the SZ-spiral groove and in a state where the tape side edges, which would be positioned at the inside of the bends of the groove of the inverting portions when assuming that the optical fiber tape were accommodated in the groove in a state where the tape surface faced the groove bottom at the inverting portions of the groove, face the groove bottom.

The direction (direction of opening) of the groove of the grooved spacer constantly changes in the longitudinal direction of the grooved spacer. In the cable of the present invention, the direction of the optical fiber tape change with respect to the direction of the groove. That is, the tape surface of the optical fiber tape face the groove bottom at the center portions between inverting portions of the groove, but changes in direction in the groove so that the tape side edge at what would be the inside of the bend if the tape were flexed with the tape surface facing the groove as it were at the inverting portions of the groove faces the groove bottom (tape stands in groove). If the direction of the optical fiber tape inside the groove changes in this way, then the optical fiber tape will be flexed in a direction causing mainly the tape surface to bend at both the center portions between inverting portions of the groove and at the inverting portions of the groove and therefore there will be almost no more flexing applied in the direction causing the tape side edges to bend. Further, the torsion applied to the optical fiber tape will be reduced. Therefore, the increase in transmission loss of the optical fibers in the optical fiber tape will become extremely small.

Note that the reason the inverting angle of the groove was made at least 180° was that a rotational angle of at least 90° is needed for the optical fiber tape to be smoothly changed in direction from the state with the tape surface facing the groove bottom at the center portions between inverting portions of the groove to the state where the tape side edge faces the groove bottom at the inverting portions of the groove. Therefore, at least 180° was needed for the inverting angle of the groove.

Preferably, the inverting angle of the SZ-spiral groove is in a range from 180° to 360°. If the inverting angle of the groove becomes more than 360°, the ease of removal of the optical fiber tape from the groove will be harmed. If considering the ease of removal of the optical fiber tape from the groove, then the inverting angle of the groove should be no more than 360°. Accordingly, the inverting angle of the groove is normally selected within the range of 180° to 360°. The preferable range of the inverting angle of the groove is 210° to 330° and the more preferable range is 270° to 300°.

More preferably, when a plurality of optical fiber tapes are accommodated in a single SZ-spiral groove, the plurality of optical fiber tapes are accommodated in a stacked state, are stacked in the depth direction of the groove at the center portions between inverting portions of the SZ-spiral grooves, and are stacked in the width direction of the grooves at the inverting portions of the grooves.

Further, preferably, the cross-sectional dimensions of the SZ-spiral groove are set to ones by which the circle circumscribing the cross-section of the stack of the plurality of optical fiber tapes can be accommodated in the groove.

Specifically, when the width of the optical fiber tapes is W, the thickness is T, and the number of tapes stacked is N, the cross-sectional dimensions of the SZ-spiral groove of the grooved spacer are such that the diameter E of the inscribed circle of the groove (circle contacting the three sides of the groove, that is, the bottom and the two lateral sides) and groove depth D satisfy the following formula:

$$D \geq E \geq \{W^2 + (NT)^2\}^{1/2}$$

If the diameter E of the inscribed circle of the groove and the depth D of the groove are set as in the above formula, the dimensions of the groove will become larger than the length of the diagonal of the stack of the optical fiber tapes (including case of one tape) and the stack of optical fiber tapes will be smoothly changed in direction in the groove. Further, due to this, the internal stress generated in the state when the optical fiber tapes receive flexing or torsion will be dispersed more easily. Accordingly, setting the dimensions of the groove in the above way is also effective for suppressing the increase of transmission loss of the optical fibers.

When the SZ-spiral groove of the grooved spacer is rectangular in cross-sectional shape, the diameter E of the inscribed circle of the groove is made equal to the width B of the groove by having the width B of the groove and the depth D of the groove satisfy the following formula:

$$D \geq B \geq \{W^2 + (NT)^2\}^{1/2}$$

Setting the width B of the groove and the depth D of the groove as in the above formula is effective for suppressing the transmission loss of the optical fibers.

Preferably, an optical fiber tape has at least four optical fibers. The greater the number of optical fibers in an optical fiber tape, the greater the width and the greater the adverse effect caused by flexing in the direction causing the tape side edges to bend, so the present invention is particularly effective when using optical fiber tapes with over four fibers with relatively large widths.

More preferably, the optical fiber tapes are accommodated in the SZ-spiral groove with an excess length.

Specifically, they are formed so that when the width of the optical fiber tapes is W, the thickness is T, and the number of tapes stacked is N, the cross-sectional dimensions of the SZ-spiral groove of the grooved spacer are such that the diameter E of the inscribed circle of the groove (circle contacting three sides of groove, that is, the bottom and the two lateral sides) and the depth D of the groove satisfy the following formula:

$$D \geq E \geq [W^2 + (NT)^2]^{1/2}$$

and when the excess length rate β of the optical fiber tapes is defined by the following formula:

$$\beta = \{(L-L_0)/L_0\} \times 100(\%)$$

where, $L_0$: length of groove of grooved spacer $L$: length of optical fiber tapes accommodated in groove the diameter E of the inscribed circle of the groove and the depth D of the groove satisfy the following formula:

$$D \geq E \geq \{(\beta+0.1)^2/0.08\} + NT$$

When the SZ-spiral groove of the grooved spacer is rectangular in cross-sectional shape, the diameter E of the inscribed circle of the groove is made equal to the width B of the groove by having the width B of the groove and the depth D of the groove satisfy the following formula:

$$D \geq B \geq \{W^2 + (NT)^2\}^{1/2}$$

and when the excess length rate $\beta$ of the optical fiber tapes is defined by the following formula:

$$\beta = \{(L-L_0)/L_0\} \times 100(\%)$$

where, $L_0$: length of groove of grooved spacer

L: length of optical fiber tapes accommodated in groove the width B of the groove and the depth D of the groove satisfy the following formula:

$$D \geq B \geq \{(\beta+0.1)^2/0.08\} + NT$$

In an optical fiber cable, it is ideal if the optical fibers become free of strain with respect to elongation strain of the cable. While the ideal cannot be reached, it is desirable to reduce the strain of the optical fibers from the elongation strain of the cable. Toward this end, it is effective to give an excess length to the optical fiber tapes accommodated in the groove. If an excess length is given to the optical fiber tapes, however, the optical fiber tapes will undulate in the groove and cause the problem of macrobending. If the width B and the depth D of the groove are set as in the above formulas, however, it becomes possible to suppress the bending strain caused by the macrobending of the optical fibers to less than 0.1 percent, a figure set considering long-term reliability in the state with the optical fiber tapes accommodated in the groove given a necessary excess length rate $\beta$.

Preferably, the cross-section of the SZ-spiral groove grows larger from the groove bottom of the width B to the opening.

The grooved spacer is comprised of a single spacer with the SZ-spiral groove formed directly on it along the longitudinal direction of the optical fiber cable. Alternatively, the groove spacer is comprised of a plurality of grooved segments twisted around a tension member alternately in the SZ-directions.

Preferably, the optical fiber tapes may be accommodated in some SZ-spiral grooves and single optical fibers may be accommodated and jelly filled in other SZ-spiral grooves. More preferably, the optical fiber tapes may be accommodated in the SZ-spiral grooves supported by buffer members. More preferably, the optical fiber tapes may be accommodated and jelly in the SZ-spiral grooves.

Preferably, the grooved spacer is supported by a supporting line provided along it.

BRIEF DESCRIPTION OF THE DRAWINGS

The above objects and features of the present invention and other objects and features will become clearer from the following description made with reference to the attached drawings, in which:

FIG. 1A and FIG. 1B are a cross-sectional view and a side view of an optical fiber cable of a first embodiment for explaining the basics of an optical fiber cable according to the present invention;

FIG. 2 is a side view of a grooved spacer of the optical fiber cable of the present invention shown in FIG. 1;

DESCRIPTION OF THE PREFERRED EMBODIMENTS

Figure 3G:
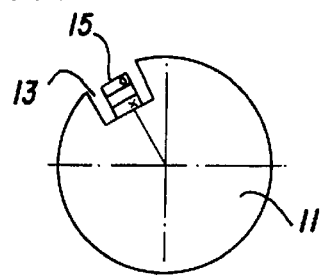
FIG. 3A to FIG. 3K are cross-sectional views, taken along the line a—a to the line k—k of FIG. 1B, of an example of the relationship between the direction of the groove and the direction of the optical fiber tapes.

Below, preferred embodiments of the optical fiber cable of the present invention will be explained in further detail referring to the drawings.

First Embodiment

FIG. 1A to FIG. 1B, FIG. 2, and FIG. 3A to FIG. 3K are view showing the basic configuration of an optical fiber cable of a first embodiment of an optical fiber cable according to the present invention.

FIG. 1A is a cross-sectional view of a grooved spacer 11 provided in the optical fiber cable, while FIG. 1B is a view schematically showing the side of the grooved spacer 11 in the longitudinal direction. FIG. 2 is a side view of a grooved spacer 11 having one SZ-spiral groove 13 and more accurately shows the view of FIG. 1B.

Reference numeral 13A is the path of the SZ-spiral groove formed on the outer circumference of the grooved spacer 11 along its longitudinal direction. Note that in FIG. 1B, the SZ-spiral groove 13 is illustrated as one line. The grooved spacer 11 may be formed with a plurality of wave-shaped SZ-spiral grooves extending along the longitudinal direction of the cable, but here the discussion is made of provision of a single SZ-spiral groove 13 for purposes of simplification of the illustration and explanation.

Reference numeral 11 shows a grooved spacer, 13 an SZ-spiral groove formed on its outer circumference, and 15 an optical fiber tape accommodated in the SZ-spiral groove 13.

The SZ-spiral groove is a groove consisting of an alternating combination of an S-direction spiral (right twist direction spiral) groove and Z-direction spiral (left twist direction spiral) groove. Note that the SZ-spiral groove 13 is formed "in a wave shape", with the direction of the groove periodically inverting, along the longitudinal direction of the cable and that it is not formed as a "one-directional spiral" around the cable.

The SZ-spiral groove 13 is formed, as shown in FIG. 1B, so as to periodically invert in direction of the wave at the outer circumference of the grooved spacer 11. Reference numeral 17 shows an inverting portion of the SZ-spiral groove 13, reference numeral 19 a center portion between two inverting portions of the groove (center portion from one inverting portion 17 of groove to the next inverting portion 17), and reference symbol P the inverting pitch (center line distance of grooved spacer from one inverting portion 17 to the next inverting portion 17).

Note that the "inside of the bend of the groove at the inverting portion" means the portion of 17a in FIG. 2. That is, reference numeral 17 indicates the inverting portion of the groove 13, reference numeral 17a the inside of the bend of the groove at the inverting portion, reference numeral 17b the outside of the bend of the groove of the inverting portion 17, and reference numeral 19 the center portion between inverting portions.

In FIG. 1A, the symbol θ indicates the inverting angle of the groove (rotational angle in circumferential direction of grooved spacer from one inverting portion 17 of groove to next inverting portion 17). In this example, θ=300°.

Figure 3F:
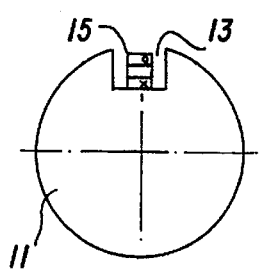
Figure 3E:
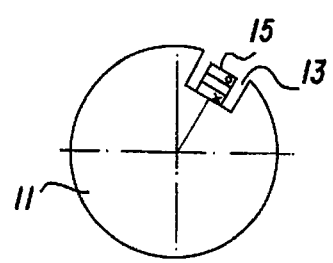
Figure 3H:
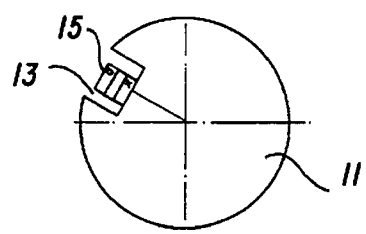
Figure 3D:
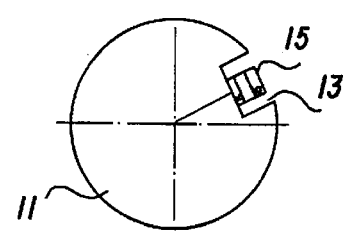
Figure 3I:
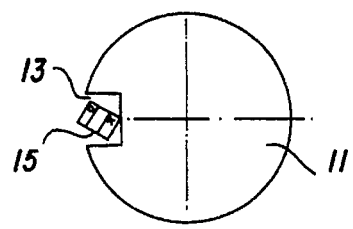
Figure 3C:
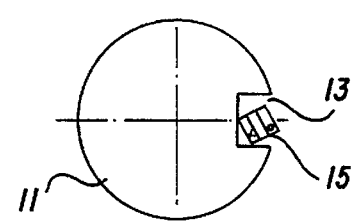
Figure 3J:
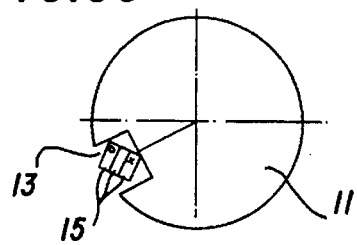
Figure 3B:
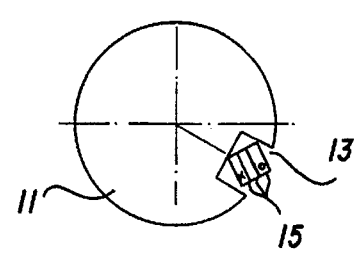
Figure 3K:
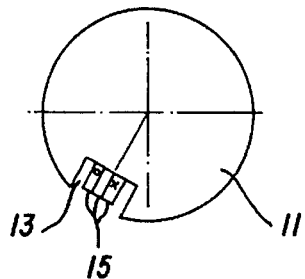
Figure 3A:
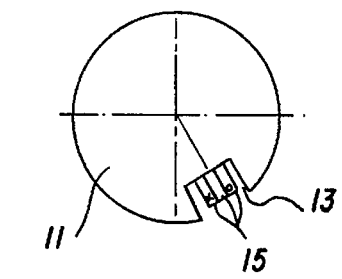

FIG. 3A to FIG. 3K are cross-sectional views along line a—a to line k—k of FIG. 1B. FIG. 3A is a cross-sectional view of the optical fiber tape 15 at the inverting portion 17, FIG. 3F is a cross-sectional view of the optical fiber tape 15 at the center portion 19 between inverting portions, and FIG. 3K is a cross-sectional view of the optical fiber tape 15 at the inverting portion 17 next to (at back side of cable) the inverting portion 17 illustrated in FIG. 3A.

In this example, three optical fiber tapes 15 are accommodated stacked in the SZ-spiral groove 13. Since the SZ-spiral groove is not formed as a one-directional spiral, but is formed in a wave shape, with the direction periodically inverting, along the outer circumference of the optical fiber cable, the stack of the optical fiber tape 15 is introduced into the SZ-spiral groove 13 twisted along the SZ-spiral groove 13. To enable discrimination of each of the three optical fiber tapes 15 and their directions, an o mark and an x mark are given to one side of the two outside optical fiber tapes 15.

In FIG. 3A to FIG. 3K, just one inverting pitch P is shown, but at the next inverting pitch, the state becomes as illustrated in FIG. 3K to FIG. 3A in the reverse direction. This is repeated.

At the center portion 19 between inverting portions of the SZ-spiral groove 13, as shown in FIG. 3F, the optical fiber tapes 15 are accommodated in the SZ-spiral groove 13 in the state with the tape surfaces facing the bottom of the SZ-spiral groove 13. At the inverting portions 17 of the SZ-spiral groove 13, as shown in FIG. 3A and FIG. 3K, the optical fiber tapes 15 are accommodated in the SZ-spiral groove 13 in a state with the tape side edges facing the bottom of the SZ-spiral groove 13 (in a state with the tapes standing in the groove). In FIG. 3A and FIG. 3K, however, the direction of the optical fiber tapes 14 is opposite from the direction of the SZ-spiral groove 13. That is, in the illustration of FIG. 3A, the side edges opposite to the o mark and the x mark of the optical fiber tapes 15 face the groove bottom, but in the illustration of FIG. 3K, the o mark and x mark side edges of the optical fiber tapes 15 face the groove bottom. This state is one in which the optical fiber tapes are arranged so that the side edges, which would be positioned at the "inside of the bend of the groove at the inverting portions" when assuming that the optical fiber tapes 15 were accommodated in the groove with the tape surfaces facing the groove bottom even at the inverting portions, face the groove bottom.

The optical fiber tapes 15 accommodated in the SZ-spiral groove 13 is bent mainly in the direction causing the tape surfaces to bend both at the inverting portions 17 of the SZ-spiral groove and at the center portions 19 between inverting portions. Accordingly, this state is one in which there is the least flexing in the direction causing the tape side edges to bend in the optical fiber tapes 15.

With this method of accommodation, further, the torsion applied to the optical fiber tapes 15 also becomes smaller. A glance at FIG. 3A to FIG. 3K would appear to show that the stack of optical fiber tapes 15 turn and twist in the SZ-spiral groove 13, but in fact only the direction of the SZ-spiral groove 13 changes in the distance between the line a—a to line d—d and the distance between the line h—h and line k—k illustrated in FIG. 1A. The direction of the optical fiber tapes 14 does not change must at all. What this means is that there is no torsion applied to the optical fiber tapes in the above distances. Torsion is applied to the optical fiber tapes 15 only in the distance between the line d—d and line h—h, that is, only in the 120° range from 90° to 210° in the total inverting angle θ=300°.

In a conventional cable, torsion was applied to the optical fiber tapes at all positions in the distance from one inverting portion to the next inverting portion. Compared with this, the optical fiber cable of the first embodiment of the present invention has far less torsion applied to the optical fiber tapes 15. In one inverting pitch, it just a small (θ=300°)−120°=180°.

Inverting Angle θ

Next, an explanation will be made of the inverting angle θ of the groove of the grooved spacer. The direction of the SZ-spiral groove 13 has to rotate 90° from the state of FIG. 3A where the side edges of the optical fiber tapes 15 face the bottom of the SZ-spiral groove 13 to the state of FIG. 3D where the tape surfaces face the groove bottom. Similarly, the direction of the SZ-spiral groove 13 has to rotate 90° from the state of FIG. 3H to the state of FIG. 3K. In other words, to obtain a state where the tape side edges of the optical fiber tapes 15 face the groove bottom at the inverting portions 17 of the groove 13 and the tape surfaces face the groove bottom at the center portions 19 between inverting portions of the groove, the direction of the groove at the two sides of the inverting portion has to rotate at least 90° in the circumferential direction of the grooved spacer.

Accordingly, the inverting angle θ of the SZ-spiral groove 13 of the grooved spacer 11 has to be made at least 180°. Note that θ=180° is a state where almost no torsion is applied to the optical fiber tapes 15. The upper boundary of the inverting angle θ of the groove 13 is desirably, as mentioned above, made not more than 360°. Accordingly, the inverting angle θ of the groove is usually set to a suitable value in the range of 180° to 360°.

The relationship between the direction of the SZ-spiral groove 13 and the direction of the optical fiber tapes 15 shown in FIG. 3A to FIG. 3K is the ideal state. In actuality, the optical fiber tapes 15 move freely in the groove 13, so change in direction to the most stable state in the groove 13 due to the elasticity, rigidity, or flexing force at the inverting portions of the optical fiber tapes themselves. A specific example of this is shown in FIG. 4A to FIG. 4K. FIG. 4A to FIG. 4K are cross-sectional views along the line a—a to line k—k of FIG. 1B and correspond to FIG. 3A to FIG. 3K.

Figure 4G:
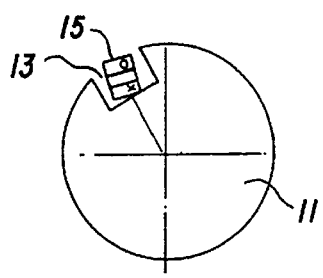
FIG. 4A to FIG. 4K are cross-sectional views, taken along the line a—a to the line k—k of FIG. 1B, of another example of the relationship between the direction of the groove and the direction of the optical fiber tapes.
Figure 4F:
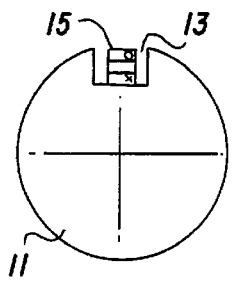
Figure 4E:
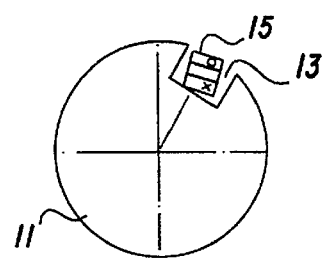
Figure 4H:
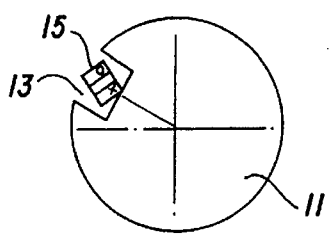
Figure 4D:
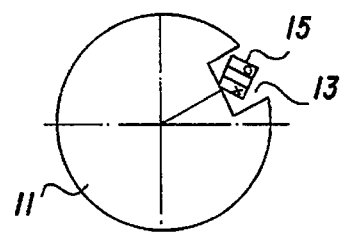
Figure 4I:
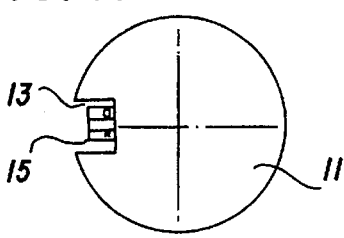
Figure 4C:
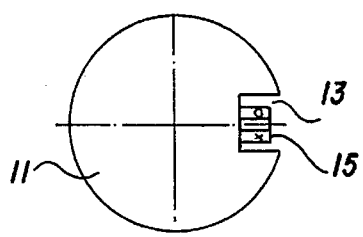
Figure 4J:
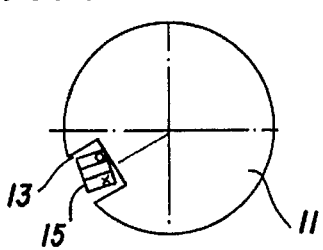
Figure 4B:
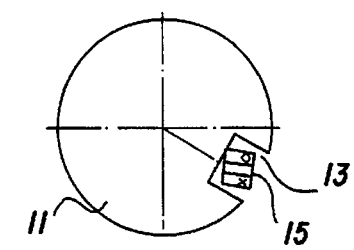

At the center portions 19 between inverting portions of the SZ-spiral groove 13, as shown in FIG. 4F, the optical fiber tapes 15 are accommodated in the groove 13 with the tape surfaces facing the groove bottom. This point is the same as the case shown in FIG. 3F. In the SZ-spiral groove 13 show in FIG. 4C and FIG. 4I, wherein the direction of the groove 13 rotates +90°/−90° from the state shown in FIG. 4F, the optical fiber tape 15 stand substantially straight up in the groove 13. Further, as shown in FIG. 4A and FIG. 4K, at the inverting portions of the groove 13, the optical fiber tapes 15 fall over toward the inside 17a of the bend of the groove 13 of the inverting portions 17 from the state standing straight up from the bottom of the SZ-spiral groove 13.

Figure 4K:
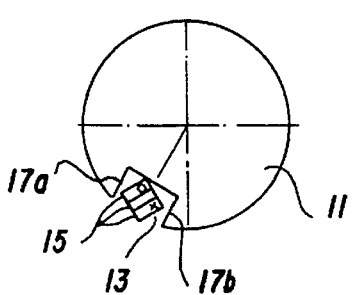
Figure 4A:
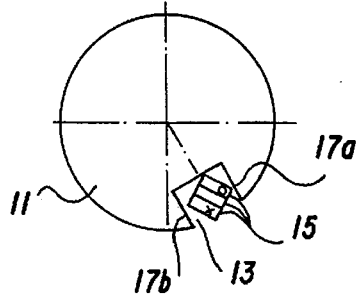

In the present invention, "the optical fiber tapes are accommodated in the groove 13 in a state with the tape side edges facing the groove bottom at the inverting portions 17 of the groove 13" includes the states such as shown in FIG. 4A and FIG. 4K.

Figure 5A:
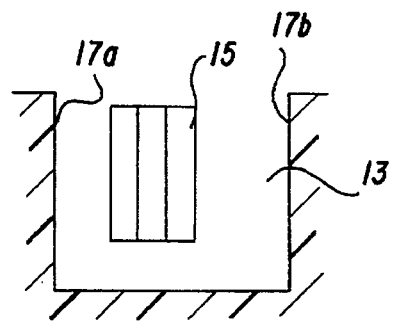
FIG. 5A and FIG. 5B are cross-sectional views illustrating the state of accommodating the optical fiber tapes in an SZ-spiral groove.
Figure 5B:
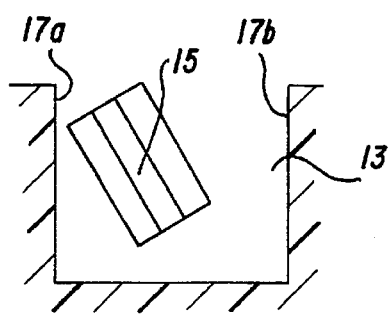

Note that in FIG. 3A to FIG. 3K and FIG. 4A to FIG. 4K, all or part of the side edges of the stack of optical fiber tapes touched the groove bottom at the inverting portions of the groove 13, but depending on the tension applied to the optical fiber tapes or the size of the inverting angle of the SZ-spiral groove, in some cases the side edges of the stack of the optical fiber tapes will rise up from the groove bottom without contacting it. FIG. 5A and FIG. 5B show specific examples of this. FIG. 5A shows the state of the side edges of the stack of optical fiber tapes 15 in FIG. 3A rising up from the groove bottom. FIG. 5B shows the state of the side edges of the stack of optical fiber tapes in FIG. 4A rising up from the groove bottom. Note that 17a is, as mentioned earlier, 17a is the inside of the bend of the inverting portions, while 17b is the outside of the bend of the inverting portions. In the present invention, "the optical fiber tapes are accommodated in the groove in a state with the tape side edges facing the groove bottom at the inverting portions of the groove" include the states as shown in FIG. 5A and FIG. 5B where the optical fiber tapes 15 rise up from the groove bottom.

Figure 6A:
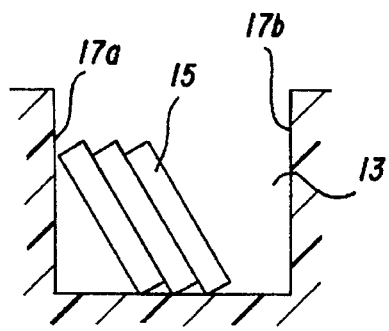
FIG. 6A and FIG. 6B are cross-sectional views illustrating another state of accommodating the optical fiber tapes in an SZ-spiral groove.
Figure 6B:
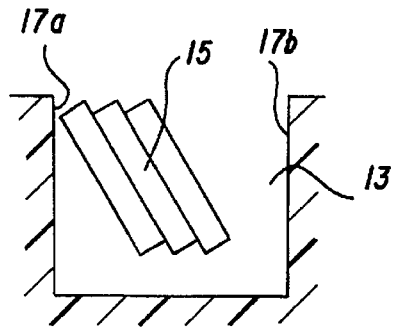

Further, the stack of the optical fiber tapes accommodated in the SZ-spiral groove does not constrain the optical fiber tapes among themselves, so sometimes the perfectly stacked state (state with the side edges of the optical fiber tapes not deviated from each other) changes to a somewhat deviated state (state with the side edges of the optical fiber tapes deviated from each other). FIG. 6A and FIG. 6B show specific examples of this. FIG. 6A shows the state where the stacked state of the stack of the optical fiber tapes 15 is somewhat uneven in the case where the stack of the optical fiber tapes touches the groove bottom while FIG. 6(B) shows the state where the stacked state of the stack of the optical fiber tapes 15 is somewhat uneven in the case where the stack of the optical fiber tapes rises up from the groove bottom. In the present invention, "the optical fiber tapes are accommodated in the groove in a state with the tape side edges facing the groove bottom at the inverting portions of the groove" include the states as shown in FIG. 6A and FIG. 6B where the stacked states of the stacks of optical fiber tapes 15 are somewhat uneven.

Dimensions of Grooved Spacer

The dimension of the grooved spacer will be explained next.

Figure 7:
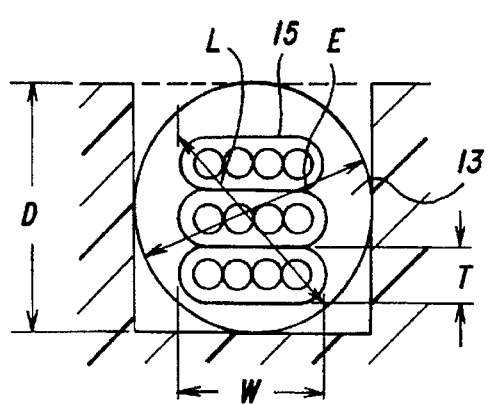
FIG. 7 is a cross-sectional view of the relationship between the dimensions of the optical fiber tape and the depth and dimensions of the inscribed circle of the groove of the grooved spacer in an optical fiber cable according to the present invention.

To obtain a state of the optical fiber tapes 15 in a groove 13 of the grooved spacer where the tape surfaces face the groove bottom and a state where the tape side edges face the groove bottom, it is desirable that the relative direction of the stack of the optical fiber tapes 15 in the groove 13 be able to be changed without destroying the stacked state. On the other hand, it is extremely difficult in the manufacture of a grooved spacer to change the cross-sectional dimensions of the groove 13 in the longitudinal direction. Accordingly, if the dimensions of the groove 13 are to be made constant over its entire length, then the dimensions of the groove 13 of the groove spacer should be set as follows:

That is, the cross-sectional dimensions of the SZ-spiral spiral groove 13 are set to ones by which the circle circumscribing the cross-section of the stack of the plurality of optical fiber tapes (including case of one tape) can be accommodated in the SZ-spiral groove 13. The dimensions of the groove 13 of the grooved spacer 11 may be set as follows:

As shown in FIG. 7, when the width of the optical fiber tapes 15 is W, the thickness is T, and the number of tapes stacked is N (N=3 in example of FIG. 7), the cross-sectional dimensions of the groove 13 of the grooved spacer 11 are such that the diameter E of the inscribed circle of the groove (circle contacting the three sides of the groove, that is, the bottom and the two lateral sides) and groove depth D satisfy the following formula:

$$D \geq E \geq \{W^2 + (NT)^2\}^{1/2} \quad (1)$$

Figure 8:
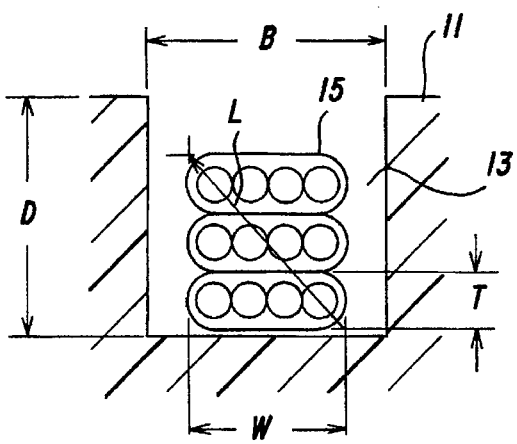
FIG. 8 is a cross-sectional view showing the relationship between the dimensions of the optical fiber tapes and the dimensions of the groove of the groove spacer in an optical fiber cable according to the present invention.

In particular, when the SZ-spiral groove 13 of the grooved spacer is rectangular in cross-sectional shape, as shown in FIG. 8, when the width of the optical fiber tapes 15 is W, the thickness is T, and the number of tapes stacked is N (N=3 in example of FIG. 8), the diameter E of the inscribed circle of the groove is made equal to the width B of the groove by having the width B of the groove and the depth D of the groove satisfy the following formula:

$$D \geq B \geq \{W^2 + (NT)^2\}^{1/2} \quad (2)$$

That is, the width B and the depth D of the SZ-spiral groove 13 are made larger than the length $\{W^2 + (NT)^2\}^{1/2}$ of the diagonal L of the N number of optical fiber tapes 15. If the dimensions of the SZ-spiral groove 13 are set in this way, then the width B and the depth D of the groove 13 become larger than the length L of the diagonal L of the stack of the optical fiber tapes 15, so the stack of the optical fiber tapes 15 in the groove 14 will be able to be changed in relative direction without its stacked state being destroyed and without occurrence of excessive stress. No torsional stress will be applied to the optical fiber tapes 15 and therefore no strain will occur.

Note that if the grooved spacer 11 is formed by extrusion, the two side walls of the groove 13 at the inverting portions 17 of the groove 13 will sometimes slant toward the inside 17a of the bend of the inverting portions 17. Even if such a slant in the groove occurs at the inverting portions 17 of the groove 13, this will not obstruct the accommodation of the stack of the optical fiber tapes 15. If a slant occurs in the groove 13 at the inverting portions 17 of the groove 13, it is sufficient to set things so that the width B and the depth D of the groove 13 satisfy the formula (2) at locations other than the inverting portions 17 of the groove 13.

Example 1 of First Embodiment

A specific example will be shown below based on the above first embodiment.

Figure 9A:
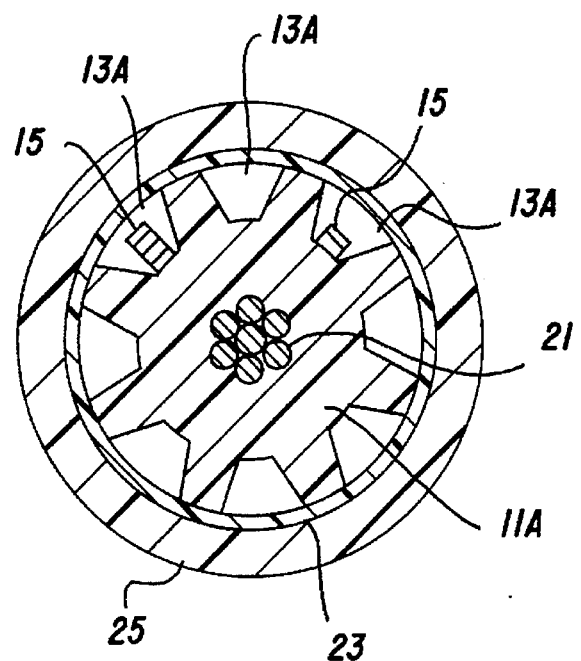
FIG. 9A and FIG. 9B are a cross-sectional view of an optical fiber cable of a first example of the first embodiment of the optical fiber cable of the present invention at the center portions between inverting portions of grooves and a cross-sectional view at the inverting portions of the grooves.
Figure 9B:
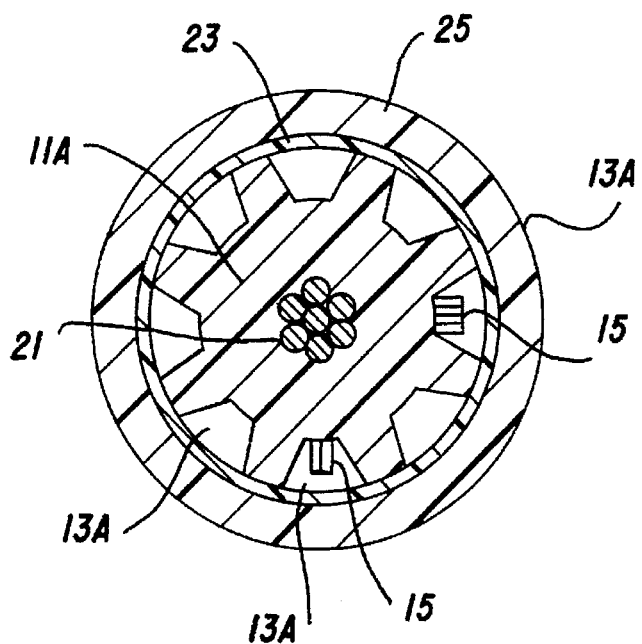

FIG. 9A and FIG. 9B show the more specific cross-sectional configuration of the first embodiment of the optical fiber cable according to the present invention. FIG. 9A is a cross-sectional view at the center portions 19 between inverting portions of a groove 13 along the line f—f of FIG. 1B, while FIG. 9B is a cross-sectional view of the inverting portions 17 of a groove 13 along the line a—a or the line k—k of FIG. 1B.

The grooved spacer 11A is a polyethylene extruded body and has at its center a steel twisted wire tension member 21. The outer diameter of the grooved spacer 11A is 15.8 mm and the diameter between groove bottoms is 10 mm. The SZ-spiral grooves 13A do not have block-shaped cross-sections as illustrated in FIG. 3 to FIG. 5, but are grooves with wide entrances and narrow bottoms. The cross-sectional dimensions of the grooves 13A are a width of the groove bottom of 1.3 mm, a width of the groove top end of 4.5 mm, and a groove depth of 2.3 mm. The inverting angle θ of the groove 13A is about 300° and the inverting pitch P is about 240 mm.

Eight grooves 13A are formed on the grooved spacer 11A. One of the grooves 13A among these accommodates the stack of four optical fiber tapes 15. The groove 13A two grooves away from that groove 13A accommodates a stack of two optical fiber tapes 15. The stacks of optical fiber tapes 15 are accommodated in the grooves 13A so that the tape surfaces face the groove bottoms at the center portions 19 between inverting portions of the grooves 13A as shown in FIG. 9A and so that the tape side edges face the groove bottoms at the inverting portions 17 as shown in FIG. 9B. The optical fiber tapes 15 are arranged so that no tension is applied to them in the state accommodated in the grooves 13A. Note that reference numeral 23 shows a holding tape and reference numeral 25 a sheath.

Figures 10A, 10B, 10C, 10D:
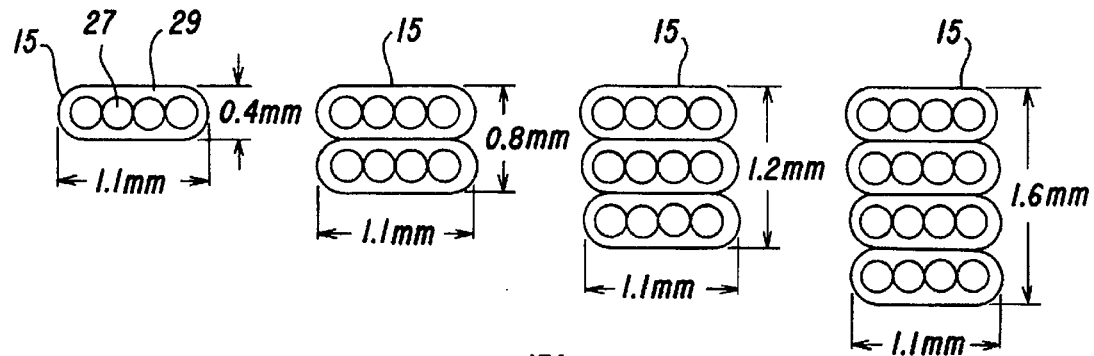
FIG. 10A to FIG. 10D are cross-sectional views of the state of stacking of optical fiber tapes.

The optical fiber tapes 15, as shown in FIG. 10A, are comprised of four optical fibers 27 arranged in parallel and given a common coating 29. Their cross-sectional dimensions are a width of 1.1 mm and a thickness of 0.4 mm. The cross-sectional dimensions of a stack of four optical fiber tapes 15 are as illustrated in FIG. 10D. The cross-sectional dimensions of a stack of two optical fiber tapes 15 are as illustrated in FIG. 10B.

A prototype of the optical fiber cable illustrated in FIG. 9A and FIG. 9B was prepared and the transmission losses of the optical fiber tapes 15 were measured at the stage where the optical fiber tapes 15 were accommodated in the grooves of the grooved spacer 11A and a holding tape 23 was applied and the stage where the sheath 25 was applied. The measurement wavelength λ was 1.55 μm. The results are shown in Table 1.

TABLE 1

|  |  | Stage where holding tape is applied | Stage where sheath is applied |
|---|---|---|---|
| 2 tapes stacked | Average | 0.23 dB/km | 0.22 dB/km |
|  | Minimum | 0.21 | 0.19 |
|  | Maximum | 0.27 | 0.25 |
| 4 tapes stacked | Average | 0.23 | 0.24 |
|  | Minimum | 0.19 | 0.19 |
|  | Maximum | 0.26 | 0.28 |

The target value of the transmission loss is not more than an average 0.25 dB/km, so this cable was confirmed to have sufficient performance.

Example 2 of First Embodiment

A more detailed example based on the above first embodiment will be shown.

Figure 11A:
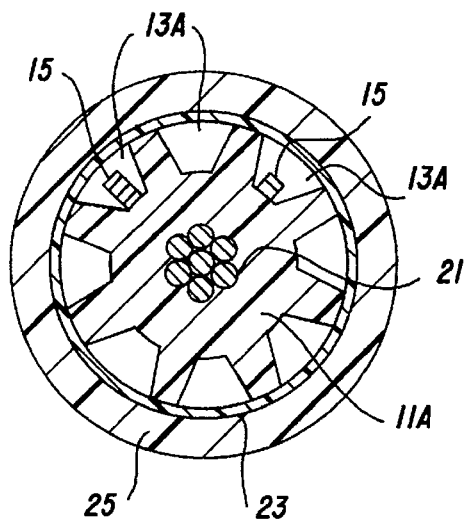
FIG. 11A and FIG. 11B are a cross-sectional view of the center portions between inverting portions of grooves in an optical fiber cable of a second example of the first embodiment of the optical fiber cable of the present invention and a cross-sectional view at the inverting portions of the grooves.
Figure 11B:
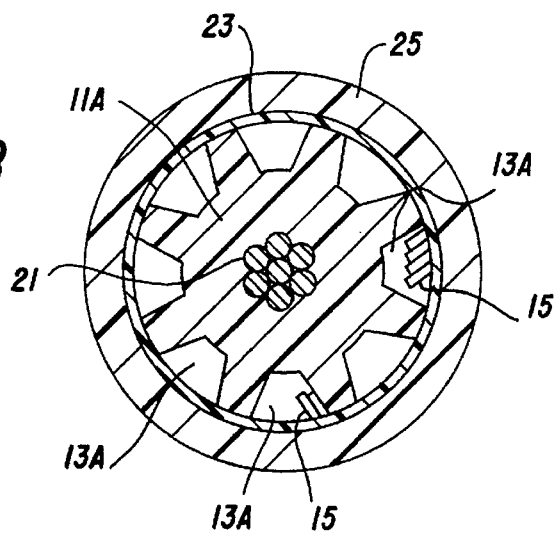

Depending on the manufacturing conditions, the stack of the optical fiber tapes 15 sometimes rises up from the groove bottoms as illustrated in FIGS. 5A and 5B and FIGS. 6A and 6B at the inverting portions of the SZ-spiral grooves 13A as illustrated in FIG. 11A and FIG. 11B. In these cases too, however, it was confirmed that the transmission loss was not more than 0.25 dB/km and the optical fiber cable of the present invention had sufficient performance.

Example 3 of First Embodiment

A more detailed third example based on the above first embodiment will be shown.

Figure 12B:
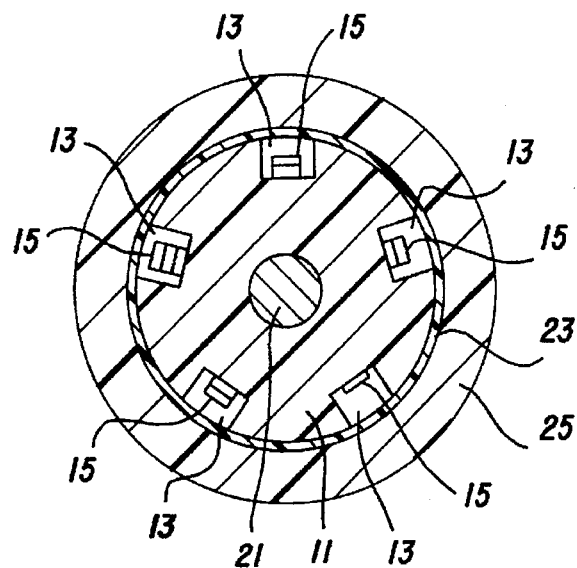
FIG. 12A, FIG. 12B and 12C are cross-sectional views of the center portions between inverting portions of grooves in an optical fiber cable of a third example of the first embodiment of the optical fiber cable of the present invention and a cross-sectional view at the inverting portions of the grooves.
Figure 12C:
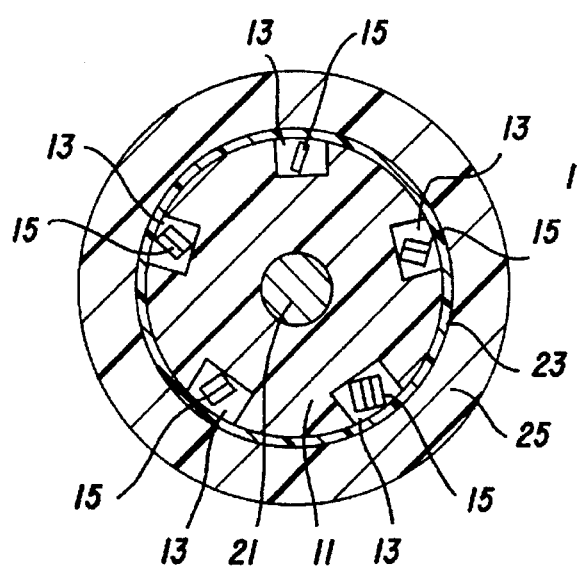
Figure 12A:
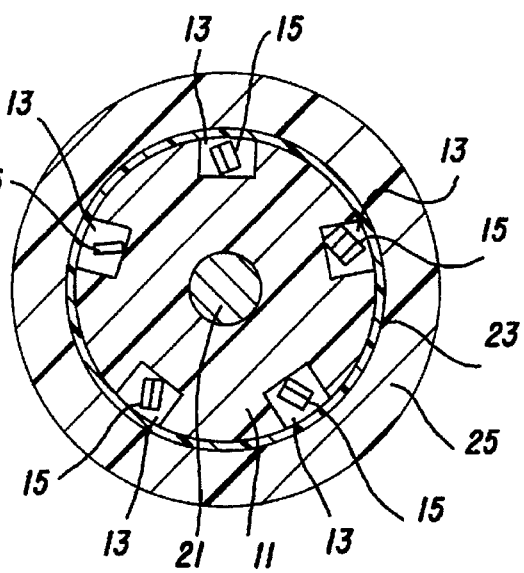

FIG. 12A to FIG. 12C show another example of the optical fiber cable according to the present invention. FIG. 12A is a cross-sectional view of one inverting portion 17 of the SZ-spiral grooves 13 (corresponding to cross-section along line a—a of FIG. 1B), FIG. 12B is a cross-sectional view of the center portion 19 between inverting portions of the grooves 13 (corresponding to cross-section along line f—f of FIG. 1B), and FIG. 12C is a cross-sectional view of the other inverting portion 17 of the grooves 13 (corresponding to cross-section along line k—k of FIG. 1B).

The grooved spacer 11 is a polyethylene extruded body and has at its center a single steel wire tension member 21. The outer diameter of the grooved spacer 11 is 10.8 mm and the diameter between the groove bottoms is 8.0 mm. The cross-sectional dimensions of the SZ-spiral groove 13 are a width of the groove of 2.0 mm and a groove depth of 1.4 mm. The inverting angle θ of the groove 13 is about 290° and the inverting pitch P is about 250 mm.

Five SZ-spiral grooves 13 are formed on the grooved spacer 11. One optical fiber tape 15 is accommodated in the no. 1 groove 13, a stack of two optical fiber tapes 15 in the no. 2 groove 13, a stack of three optical fiber tapes in the no. 3 groove 13, and stacks of two optical fiber tapes 15 in the no. 4 and no. 5 grooves 13. The optical fiber tapes 14 and their stacks are accommodated in the grooves 13 so that the tape surfaces face the groove bottoms of the SZ-spiral grooves 13 at the center portions 19 between inverting portions of the grooves 13 as shown in FIG. 12B and so that the tape side edges face the groove bottoms at the inverting portions 17 as shown in FIG. 12A and FIG. 12C. The optical fiber tapes 15 are arranged so that no tension is applied to them in the state accommodated in the grooves 13. Note that reference numeral 23 shows a holding tape and reference numeral 25 a sheath.

The optical fiber tapes 15, as shown in FIG. 10A, are comprised of four optical fibers 27 arranged in parallel and given a common coating 29. Their cross-sectional dimensions are a width of 1.1 mm and a thickness of 0.4 mm. The cross-sectional dimensions of a stack of four optical fiber tapes 15 are as illustrated in FIG. 10D. The cross-sectional dimensions of a stack of three optical fiber tapes 15 are as illustrated in FIG. 10C.

A prototype of the above optical fiber cable was prepared and the transmission losses of the optical fiber tapes 15 were measured at the stage where the optical fiber tapes 15 were accommodated in the grooves of the grooved spacer 11 and a holding tape 23 was applied and the stage where the sheath 25 was applied. The measurement wavelength λ was 1.55 μm. The results are shown in Table 2.

TABLE 2

|  | Groove no. |  | Stage where holding tape is applied | Stage where sheath is applied |
|---|---|---|---|---|
| 1 tape stacked | No. 1 | Average | 0.20 dB/km | 0.21 dB/km |
|  |  | Minimum | 0.19 | 0.20 |
|  |  | Maximum | 0.21 | 0.22 |
| 2 tapes stacked | No. 2 | Average | 0.22 | 0.22 |
|  |  | Minimum | 0.21 | 0.21 |
|  |  | Maximum | 0.24 | 0.23 |
|  | No. 4 | Average | 0.22 | 0.23 |
|  |  | Mininum | 0.21 | 0.22 |
|  |  | Maximum | 0.24 | 0.25 |
|  | No. 5 | Average | 0.22 | 0.22 |
|  |  | Minimum | 0.21 | 0.21 |
|  |  | Maximum | 0.24 | 0.23 |
| 3 tapes stacked | No. 3 | Average | 0.23 | 0.23 |
|  |  | Minimum | 0.22 | 0.22 |
|  |  | Maximum | 0.25 | 0.25 |

The target value of the transmission loss in not more than an average 0.25 dB/km, so this cable was confirmed to have sufficient performance.

Example 4 of First Embodiment

A more detailed fourth example based on the above first embodiment will be shown.

Figure 13B:
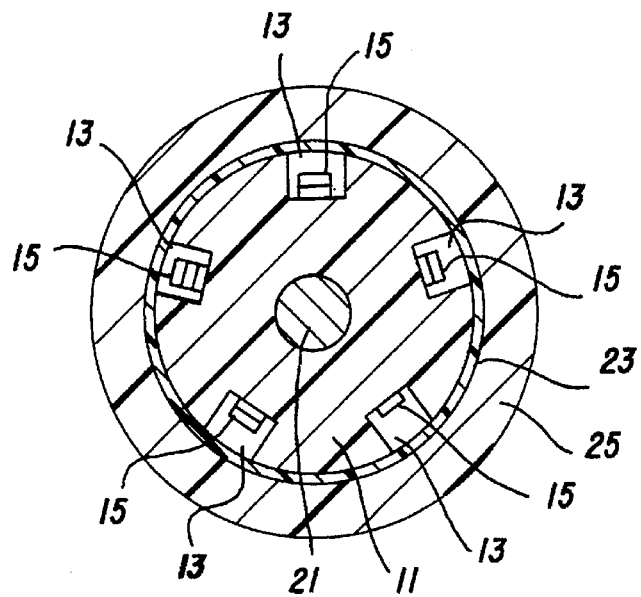
FIG. 13A, FIG. 13B and 13C are cross-sectional views of the center portions between inverting portions of grooves in an optical fiber cable of a fourth example of the first embodiment of the optical fiber cable of the present invention and a cross-sectional view at the inverting portions of the grooves.
Figure 13C:
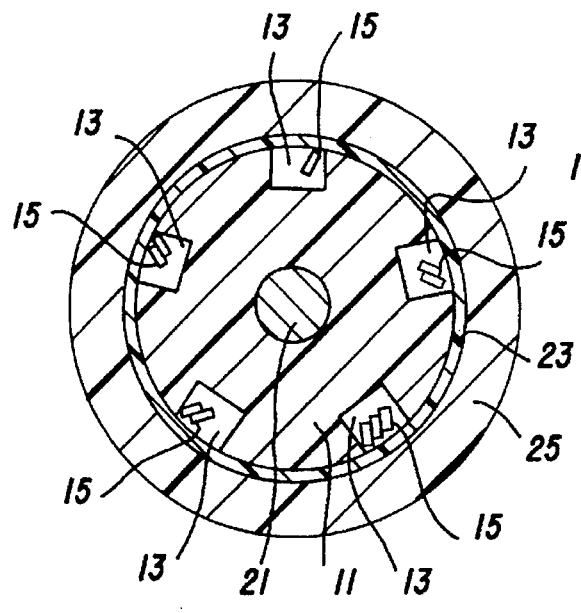
Figure 13A:
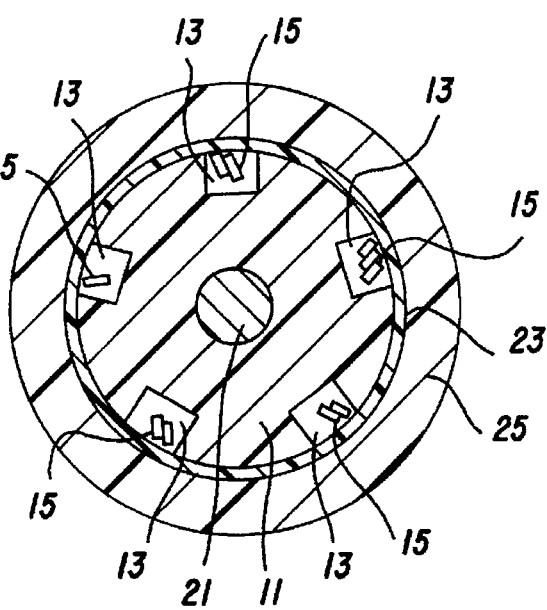

Depending on the manufacturing conditions, the stack of the optical fiber tapes 15 sometimes rises up from the groove bottoms as illustrated in FIGS. 5A and 5B and FIGS. 6A and 6B at the inverting portions of the SZ-spiral grooves 13 as illustrated in FIG. 13A to 13C. In these cases too, however, it was confirmed that the transmission loss was not more than 0.25 dB/km and the optical fiber cable of the present invention had sufficient performance. FIG. 13A to FIG. 13C correspond to FIG. 12A to FIG. 12C.

As explained above, according to the first embodiment of the present invention, the torsion and the flexing mainly in the direction causing the tape side edges to bend, applied to the optical fiber tapes 15, can be made smaller, so it was possible to suppress the transmission loss of the optical fiber tapes 15 sufficiently small.

Second Embodiment

Figure 14A:
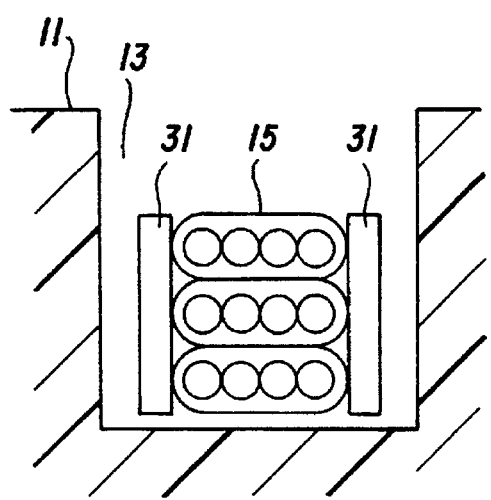
FIG. 14A and FIG. 14B are cross-sectional views illustrating the state of accommodating the optical fiber tapes in an SZ-spiral groove in a second embodiment of the optical fiber cable of the present invention.
Figure 14B:
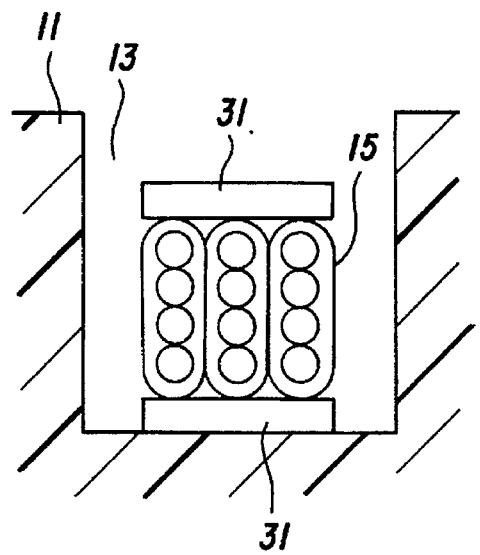

FIG. 14A and FIG. 14B show a second embodiment of the optical fiber cable according to the present invention.

FIG. 14A is a cross-sectional view of a center portion between inverting portions of the SZ-spiral grooves 13 (corresponding to cross-section along line f—f of FIG. 1B), while FIG. 14B is a cross-sectional view of an inverting portion of the grooves 13 (corresponding to cross-section along line a—a or line k—k of FIG. 1B).

The second embodiment has a stack of a plurality of optical fiber tapes 15 accommodated in an SZ-spiral groove 13 of the grooved spacer 11 in a state with the surfaces comprised of the aligned tape side edges lined with a cushioning protective tape 31 comprised of a plastic foam etc. If this is done, the side edges of the optical fiber tapes 15 will no longer be pressed directly against the groove bottom or groove walls, the possibility of occurrence of stress and strain at the optical fiber tapes 15 becomes extremely low, and the increase in transmission loss is effectively suppressed.

Third Embodiment

Figure 15:
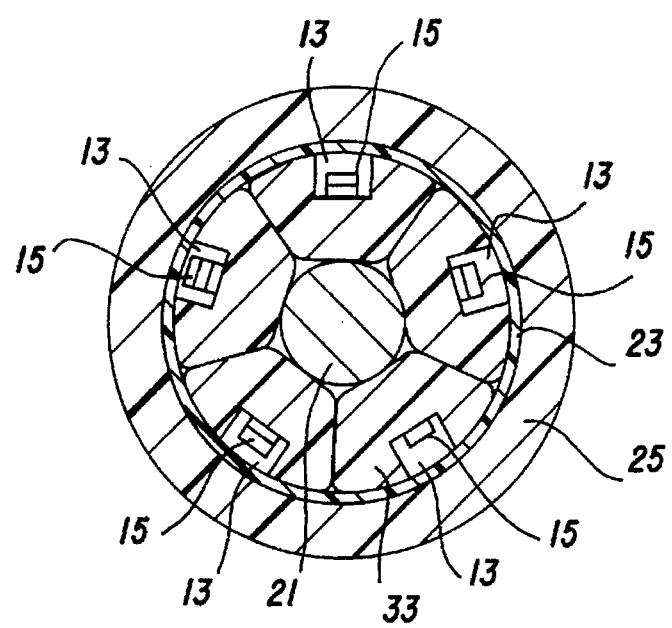
FIG. 15 is a cross-sectional view of the grooves of the optical fiber cable of a third embodiment of the optical fiber cable of the present invention.

FIG. 15 shows a third embodiment of the optical fiber cable of the present invention.

The third embodiment uses as the groove spacer 11 a plurality of grooved segments 33 each having a groove 13 and twisted by an SZ-spiral twist around a tension member 21. The rest of the configuration is smaller to that of the optical fiber cable illustrated in FIG. 9A, FIG. 9B, etc., so that the same references are given to the same portions and explanations of those component members are omitted.

In the above embodiments, explanation was made of cases of using optical fiber tapes of a thickness of 0.4 mm, but the present invention may also be applied to cases of use of optical fiber tapes of other thicknesses. For example, if use is made of a optical fiber tape of four fibers, a thickness of 0.25 to 0.27 mm, and a width of 1.1 mm (the outer diameter of the optical fibers are 0.25 mm, so the optical fiber tape becomes about the same thickness as the outer diameters), assuming that a stack of five optical fiber tapes are accommodated in one groove, then it is possible to make the groove width 1.6 mm, the groove depth 1.6 mm, and the other diameter of the grooved spacer having five grooves about 11 mm. By this, it was found that there are the effects that it is possible to raise the density of accommodation of optical fiber tapes and also possible to prevent disarray of the optical fiber tapes due to external force at the terminal where the cable is cut. Further, the transmission loss of the optical fiber tapes in a cable of these dimensions was an average 0.21 dB/km, a minimum 0.19 dB/km, and a maximum 0.25 dB/km at the stage where the holding tape was applied and an average 0.20 dB/km, a minimum 0.19 dB/km, and a maximum 0.24 dB/km at the stage where a sheath was applied.

Fourth Embodiment

Figure 16B:
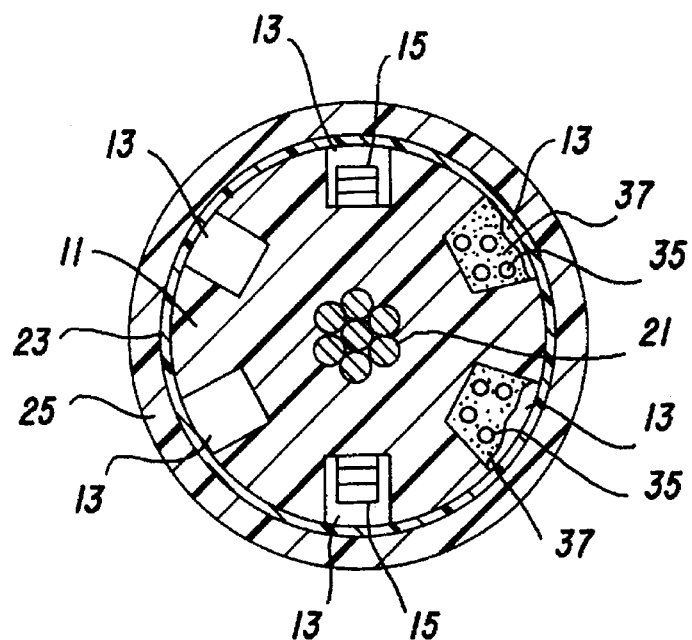
FIG. 16A to FIG. 16C are a cross-sectional view of the center portions between inverting portions of grooves in an optical fiber cable of a fourth embodiment of the optical fiber cable of the present invention and cross-sectional views at the inverting portions of the grooves.
Figure 16C:
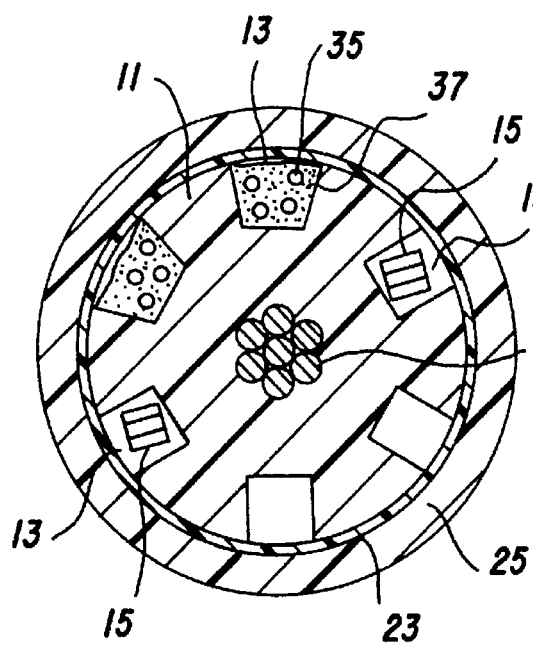
Figure 16A:
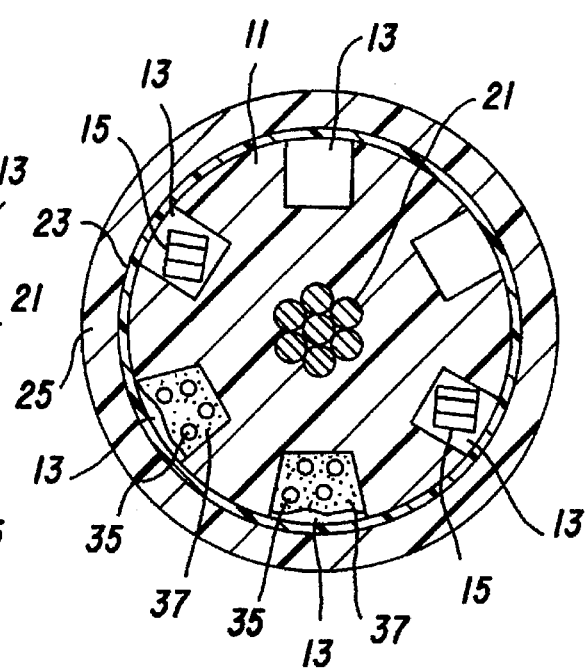

FIG. 16A to FIG. 16C show still another embodiment of the optical fiber cable according to the present invention. FIG. 16A is a cross-sectional view of one inverting portion of the grooves 13 (corresponding to cross-section along line a—a of FIG. 1B), FIG. 16B is a cross-sectional view of the center portion between inverting portions of the grooves 13 (corresponding to cross-section along line f—f of FIG. 1B), and FIG. 16C is a cross-sectional view of the other inverting portion of the grooves 13 (corresponding to cross-section along line k—k of FIG. 1B).

This cable has the grooved spacer 11 formed with a plurality of SZ-spiral grooves 13 in some of which the optical fiber tapes 15 are accommodated and in others of which single optical fibers 35 are accommodated and jelly 37 is filled.

The grooved spacer 11 is an extruded body made of polyethylene and has at its center a tension member 21. The outer diameter of the grooved spacer 11 is 15.6 mm. The nos. 1, 4, 5, and 6 of the grooves 13, where the widths of the groove bottoms and the widths of the groove top ends are equal, have widths of groove bottoms of 2.0 mm, widths of groove top ends of 4.3 mm, and groove depths of 3.4 mm. The inverting angle θ of the grooves 13 is about 280° and the inverting pitch P is about 250 mm.

A stack of three optical fiber tapes 15 is accommodated in the nos. 1 and 4 grooves 13. Four single optical fibers 35 are accommodated in the nos. 2 and 3 grooves 13 which are filled with a jelly 37. The optical fiber tapes 15 are accommodated in the grooves 13 so that the tape surfaces face the groove bottoms at the center portions between inverting portions of the grooves 13 as shown in FIG. 16B and so that the tape side edges face the groove bottoms at the inverting portions as shown in FIG. 16A and FIG. 16C. The optical fiber tapes 15 are arranged so that no tension is applied to them in the state accommodated in the grooves 13. Note that reference numeral 23 shows a holding tape and reference numeral 25 a sheath.

The optical fiber tapes 15, as shown in FIG. 10A, are comprised of four optical fibers 27 arranged in parallel and given a common coating 29. Their cross-sectional dimensions are a width of 1.1 mm and a thickness of 0.4 mm. The cross-sectional dimensions of a stack of three optical fiber tapes 15 are as illustrated in FIG. 10C. The single optical fibers 35 are nylon coated fibers with an outer diameter of 0.9 mm.

A prototype of the above optical fiber cable was prepared and the transmission losses of the optical fiber tapes 15 were measured at the stage where the optical fiber tapes 15 and single optical fibers 35 were accommodated in the grooves of the grooved spacer 11 and a holding tape 23 was applied and the stage where the sheath 25 was applied. The measurement wavelength λ was 1.55 μm.

As a result, the transmission loss of the optical fiber tapes was an average 0.22 dB/km, a minimum 0.20 dB/km, and a mimimum 0.24 dB/km at the stage where the holding tape was applied and an average 0.23 dB/km, a mimimum 0.21 dB/km, and a mimimum 0.24 dB/km at the stage where a sheath was applied. Further, the transmission loss of the single optical fibers was an average 0.21 dB/km, a mimimum 0.20 dB/km, and a minimum 0.21 dB/km at the stage where the holding tape was applied and an average 0.22 dB/km, a minimum 0.21 dB/km, and a maximum 0.23 dB/km at the stage where a sheath was applied. Accordingly, it was confirmed that this cable also had sufficient performance.

In general, when single optical fibers are accommodated in SZ-spiral grooves, they become instable in state of arrangement due to the characteristics of the grooves, but if jelly is filled in just the grooves where the single optical fibers are accommodated as in the present embodiment, then it is possible to place the single optical fibers in a semi-fixed state and thereby obtain an optical fiber cable with stable characteristics.

Fifth Embodiment

Figure 17B:
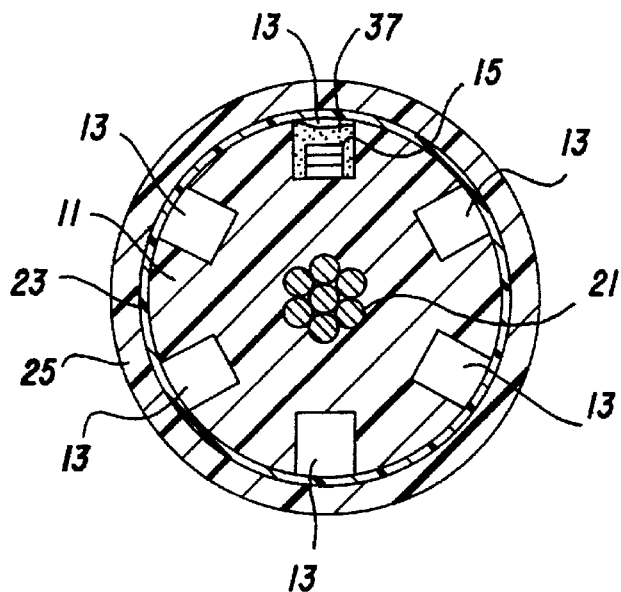
FIG. 17A to FIG. 17C are a cross-sectional view of the center portions between inverting portions of grooves in an optical fiber cable of a fifth embodiment of the optical fiber cable of the present invention and cross-sectional views at the inverting portions of the grooves.
Figure 17C:
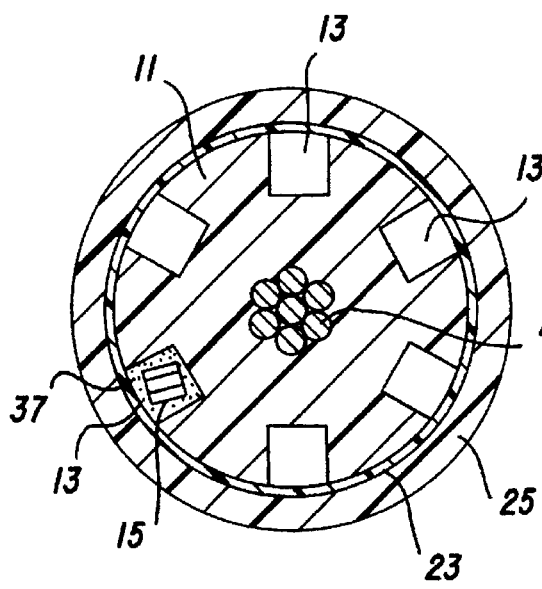
Figure 17A:
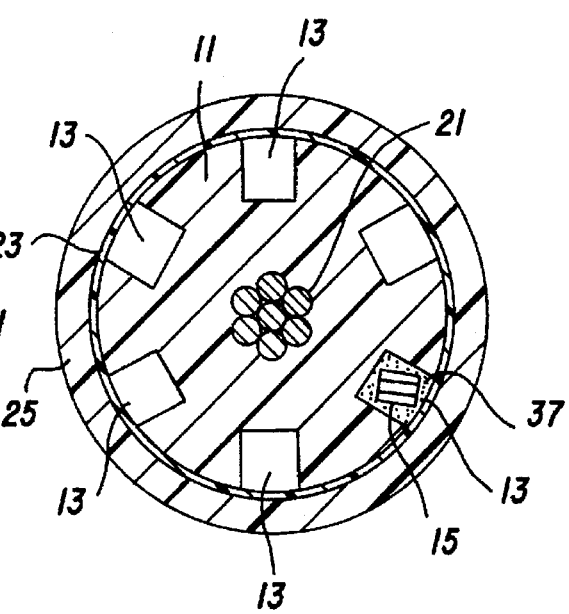

FIG. 17A to FIG. 17C show still another embodiment of the optical fiber cable according to the present invention. FIG. 17A is a cross-sectional view of one inverting portion of the grooves 13 (corresponding to cross-section along line a—a of FIG. 1B), FIG. 17B is a cross-sectional view of the center portion between inverting portions of the grooves 13 (corresponding to cross-section along line f—f of FIG. 1B), and FIG. 17C is a cross-sectional view of the other inverting portion of the grooves 13 (corresponding to cross-section along line k—k of FIG. 1B).

This cable has the grooved spacer 11 formed with a plurality of SZ-spiral grooves 13 in which the optical fiber tapes 15 are accommodated and jelly 37 is filled. This structure of cable has the effect of sufficient suppression of water running through the cable due to the jelly.

Sixth Embodiment

The optical fiber cable is subject to tension, so to prevent this from affecting the optical fibers, it is effective to give an extra margin to the optical fiber tapes 15 in the longitudinal direction in the SZ-spiral grooves 13. This extra margin of the optical fiber tapes 15 in the longitudinal direction is referred to as the "excess length".

Figure 18:
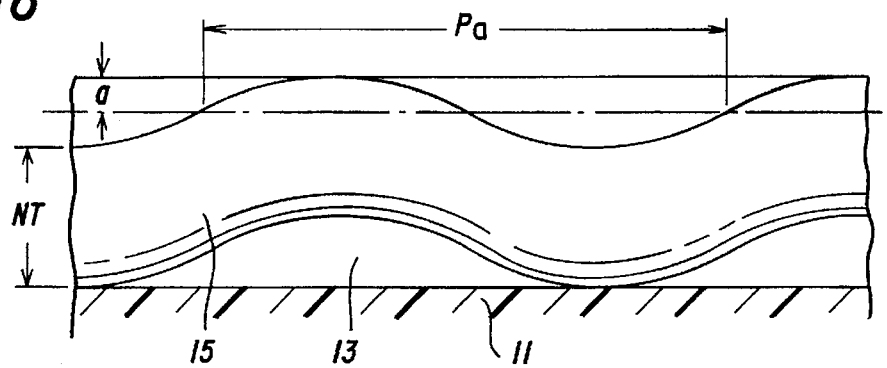
FIG. 18 is an explanatory view showing the state of undulation of the optical fiber tapes in the groove of a grooved spacer according to a sixth embodiment of the optical fiber cable of the present invention.

If an excess length is given to the optical fiber tapes 15, then, as shown in FIG. 18, there is a possibility of occurrence of "periodic bending (undulation)" where the optical fiber tapes 15 lay snake-like in the SZ-spiral grooves 13. If undulation of the optical fiber tapes 15 occurs uniformly in the longitudinal direction in the SZ-spiral grooves 13, then the optical fiber tapes 15 will draw an approximate sine curve in the grooves 13. If the pitch of the sine curve of undulation is $P_a$, the amplitude of the undulation is a, and the axial direction of the center of the grooves 13 is made the X axis, then the undulation can be approximated by the following formula:

$$f(X) = a X \sin(2\pi X/P_a) \tag{3}$$

In this case, the relationship between the excess length rate β and the pitch $P_a$ of undulation and amplitude a of undulation can be approximated by the following formula:

$$\beta = \left( \left[ \int_0^{P_a} \{1 + (2\pi a/P_a)^2 \cos^2(2\pi X/P_a)\}^{1/2} dX \right] / P_a - 1 \right) \times 100(\%) \tag{4}$$

The minimum radius of curvature ρ of the bends in the undulation (hereinafter referred to as the macrobending) may be approximated by the following formula:

$$\rho = (P_a/2\pi)^2/a \tag{5}$$

The strain ε of the optical fibers caused by the bends of the radius of curvature ρ may be approximated by the following formula if the diameter of the optical fibers is d:

$$\epsilon = d/(2\rho) \tag{6}$$

Considering the long-term reliability, it is important that the bending strain ε caused by the macrobending of the optical fibers be suppressed to less than 0.1 percent. Therefore, one should determine the dimensions of the grooves 13 in view of the required excess length.

From formulas 4, 5, and 6, when keeping the bending strain caused by macrobending at an excess length rate β to less than 0.1 percent, the maximum value of the amplitude a of undulation may be expressed approximately by the following formula:

$$a = (\beta + 0.1)^2 / 0.16 \tag{7}$$

Further, to enable a stack of optical fiber tapes 15 (thickness N×T) to undulate in the grooves 13 at an amplitude a, it is necessary to set the diameter E of the inscribed circle of the groove 13 and the depth D of the groove 13 to the following formula:

$$D \geq E \geq 2a + NT \tag{8}$$

Accordingly, with an excess length rate β, to keep the bending strain caused by the macrobend to less than 0.1 percent, it is sufficient to set the dimensions of the grooves 13 to those as shown by the formula 8.

From the formulas 7 and 8, $$D \geq E \geq \{(\beta + 0.1)^2 / 0.08\} + NT \tag{9}$$

When the groove is rectangular in cross-sectional shape, the diameter E of the inscribed circle of the groove is made equal to the width B of the groove by having the width B of the groove and the depth D of the groove satisfy the following formula. However, as shown in FIG. 10C and FIG. 10D, the case is shown where the dimension of the stack (thickness: N×T) of the optical fiber tapes 15 is larger than the width W of the optical fiber tapes 15.

$$D \geq B \geq 2a + NT \tag{10}$$

Accordingly, with an excess length rate β, to keep the bending strain caused by the macrobends to less than 0.1 percent, it is sufficient to set the dimensions of the grooves 13 to those as shown by the formula 10. The formula 12 is derived from the formulas 7 and 10. The width B and the depth D of the grooves 13 should simultaneously satisfy the formulas 11 and 12. For example, when accommodating one or stacks of two to five four-core optical fiber tapes 15 (width W=1.1 mm, thickness T=0.4 mm) in one groove 13, the minimum necessary dimensions of the width B and the depth D of the groove 13 with respect to the excess length rate β become as shown in Table 3 from formulas 11 and 12. In Table 3, the Δ marks indicate values set by the following formula 11, while no marks indicate values defined by the following formula 12.

$$D \geq B \geq [W^2 + (NT)^2]^{1/2} \tag{11}$$

$$D \geq B \geq [(\beta + 0.1)^2 / 0.08] + NT \tag{12}$$

TABLE 3

| Excess length rate β | 1 tape/ groove | 2 tapes/ groove | 3 tapes/ groove | 4 tapes/ groove | 5 tapes/ groove |
|---|---|---|---|---|---|
| 0.05% | 1.2 mm | 1.4 mm | 1.6 mm | 2.0 mm | 2.3 mm |
| 0.10 | 1.2 | 1.4 | 1.7 Δ | 2.1 Δ | 2.5 Δ |

TABLE 3-continued

| Excess length rate β | 1 tape/ groove | 2 tapes/ groove | 3 tapes/ groove | 4 tapes/ groove | 5 tapes/ groove |
|---|---|---|---|---|---|
| 0.15 | 1.2 Δ | 1.6 Δ | 2.0 Δ | 2.4 Δ | 2.8 Δ |
| 0.20 | 1.6 Δ | 2.0 Δ | 2.4 Δ | 2.8 Δ | 3.2 Δ |

The maximum load when laying an optical fiber cable is generally considered to be a load corresponding to an elongation strain of 0.2 percent, so it is desirable to make the excess length rate β at least 0.2 percent.

Further, in the case of aerial cables, it is demanded that the elongation strain of the optical fibers be no more than 0.1 percent with respect to elongation of the cable at high temperature and wind. Therefore, to make the strain of the optical fiber tapes 15 not more than 0.1 percent with respect to approximately 0.2 percent cable elongation (high temperatures and wind), it is desirable to make the excess length rate β at least 0.1 percent. If the excess length rate β is made at least 0.2 percent, then the optical fibers can be kept in a close to strain-free state even under the worst conditions and effective properties with no transmission loss can be maintained.

Example 1 of Sixth Embodiment

Figure 19A:
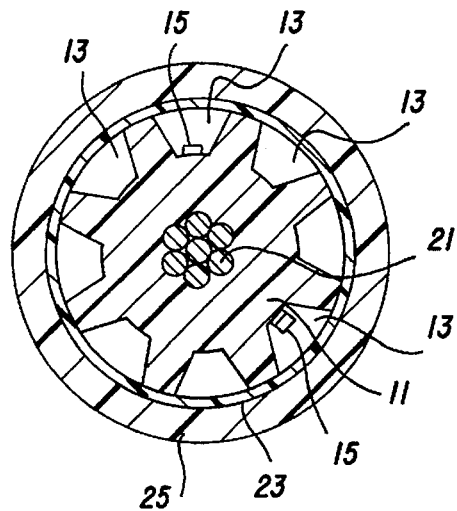
FIG. 19A and FIG. 19B are cross-sectional vies of an optical fiber cable according to the sixth embodiment of the present invention.
Figure 19B:
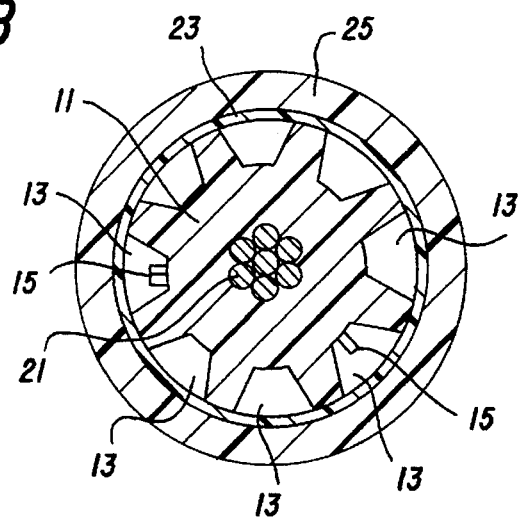

The sixth embodiment shown in FIG. 1B and introducing the excess length concept was applied to the optical fiber cable illustrated in FIG. 19A and FIG. 19B which correspond to FIG. 9A and FIG. 9B. FIG. 19A is a cross-sectional view of the center portion 19 between inverting portions of the SZ-spiral grooves 13 along the line f—f of FIG. 1B, while FIG. 19B is a cross-sectional view of the inverting portion 17 of the SZ-spiral grooves 13 along the line k—k of FIG. 1B.

The grooved spacer 11 of the optical fiber cable is comprised of a polyethylene extruded body which has a steel twisted wire tension member 21 at its center and eight SZ-spiral grooves 13 on its outer circumference.

The case shown in one where one optical fiber tape 15 is accommodated in the no. 1 groove among the eight grooves 13 and a stack of two optical fiber tapes 15 is accommodated in the no. 4 groove, but stacks of any number of optical fiber tapes may be accommodated in the grooves. The optical fiber tapes 15 are accommodated in the grooves 13 so that the tape surfaces face the groove bottoms at the center portions 19 between inverting portions of the grooves 13 as shown in FIG. 19A and so that the tape side edges face the groove bottoms at the inverting portions 17 as shown in FIG. 19B (more precisely, so that the tape side edges which would be positioned at the inside of the bends of the groove at the inverting portions when assuming that the tapes were accommodated in the grooves with the tape surfaces facing the groove bottoms, face the groove bottom). Note that reference numberal 23 shows a holding tape and reference numeral 25 a sheath.

Second Example of Sixth Embodiment

Prototypes of three types of optical fiber cables shown in Table 4 having the cable structures shown in FIGS. 19A and 19B were prepared.

TABLE 4

| Prototype no. | Dimensions of grooved spacer (mm) | | | | No. of stacked tapes | Excess length rate β (%) | No. of grooves accommodating tapes |
|---|---|---|---|---|---|---|---|
| | O.D. | Groove bottom dia. | Groove width B | Groove depth D | | | |
| 1 | 15.8 | 10.0 | 1.2 to 4.5 | 2.3 | 1 tape/groove | 0.10 | 1 and 4 |
| 2 | 15.8 | 10.0 | 1.2 to 4.5 | 2.3 | 1 tape/groove | 0.15 | 1 and 4 |
| 3 | 15.8 | 10.0 | 1.2 to 4.5 | 2.3 | 2 tapes/groove | 0.10 | 1 and 4 |

Note that in Table 4, the figures at the left side under the column "groove width B" indicate the "groove bottom width" and the figures at the right the "groove top end width".

The inverting angles θ of the grooves 13 of the grooved spacers 11 in all of the three optical fiber cables were about 300° and the inverting pitches P about 240 mm.

When a single optical fiber tape 15 was used, as shown in FIG. 11A, it was one comprised of four optical fibers 27 covered by a common coating 29 and had cross-sectional dimensions of a width of 1.1 mm and a thickness of 0.4 mm. The cross-sectional dimensions of a stack of two optical fiber tapes 15 are as illustrated in FIG. 10B.

For each of the prototypes of the above three types of optical fiber cables, the transmission loss of the optical fiber tapes was measured at the stage where the optical fiber tapes were accommodated in the grooves 13 of the grooved spacer with an excess length as illustrated in FIG. 18 and a holding tape 23 was applied and the stage where a sheath 25 was applied. The measurement wavelength λ was 1.55 μm. The results are shown in Tables 5A to 5C.

TABLE 5A

| Prototype no. | Groove no. | | Stage where holding tape is applied | Stage where sheath is applied |
|---|---|---|---|---|
| 1 | 1 | Average | 0.21 dB/km | 0.22 dB/km |
| 1 tape stacked | | Maximum | 0.22 | 0.22 |
| | | Minimum | 0.20 | 0.21 |
| β = 0.10% | 4 | Average | 0.21 | 0.22 |
| | | Maximum | 0.21 | 0.23 |
| | | Minimum | 0.20 | 0.21 |

TABLE 5B

| Prototype No. | Groove no. | | Stage where holding tape is applied | Stage where sheath is applied |
|---|---|---|---|---|
| 2 | 1 | Average | 0.22 dB/km | 0.22 dB/km |
| 1 tape stacked | | Maximum | 0.22 | 0.23 |
| | | Minimum | 0.21 | 0.21 |
| β = 0.15% | 4 | Average | 0.21 | 0.23 |
| | | Maximum | 0.22 | 0.24 |
| | | Minimum | 0.20 | 0.21 |

TABLE 5C

| Prototype No. | Groove no. | | Stage where holding tape is applied | Stage where sheath is applied |
|---|---|---|---|---|
| 3 | 1 | Average | 0.22 dB/km | 0.22 dB/km |
| 2 tapes | | Maximum | 0.23 | 0.23 |

TABLE 5C-continued

| Prototype No. | Groove no. | | Stage where holding tape is applied | Stage where sheath is applied |
|---|---|---|---|---|
| stacked | | Minimum | 0.20 | 0.21 |
| β = 0.10% | 4 | Average | 0.22 | 0.22 |
| | | Maximum | 0.23 | 0.23 |
| | | Minimum | 0.21 | 0.20 |

The target value of the transmission loss is not more than an average 0.25 dB/km, so the cables were confirmed to have sufficient performance.

Seventh Embodiment

Figure 20B:
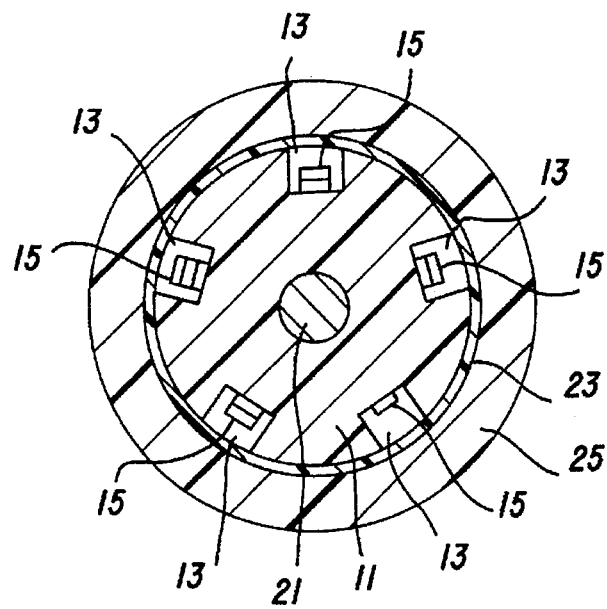
FIG. 20A to FIG. 20C are a cross-sectional view of the center portions between inverting portions of grooves in an optical fiber cable of a seventh embodiment of the optical fiber cable of the present invention and cross-sectional views at the inverting portions of the grooves.
Figure 20C:
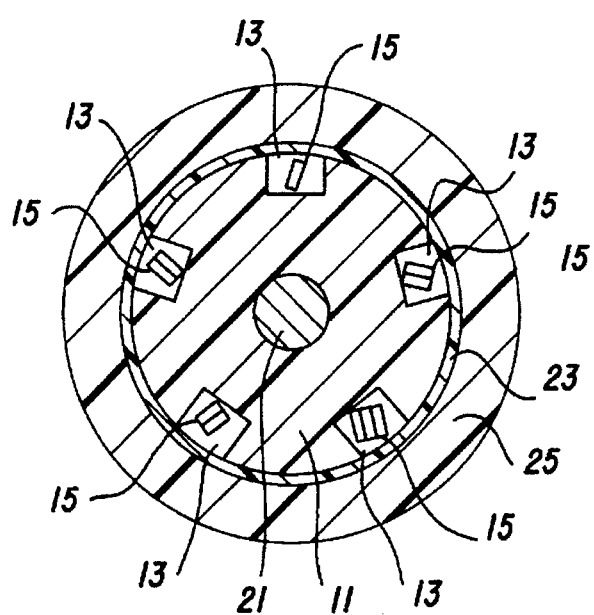
Figure 20A:
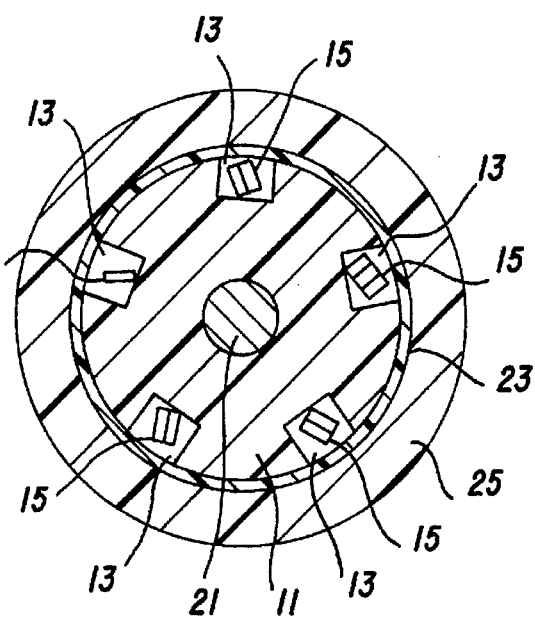

FIG. 20A to FIG. 20C show a seventh embodiment of the optical fiber cable according to the present invention. FIG. 20A to FIG. 20C are equal to FIG. 12A to FIG. 12C, but in FIG. 20A to FIG. 20C, margins of lengths are introduced.

FIG. 20A is a cross-sectional view of one inverting portion 17 of the grooves 13 (corresponding to cross-section along line a—a of FIG. 1B), FIG. 20B is a cross-sectional view of the center portion between inverting portions of the grooves 13 (corresponding to cross-section along line f—f of FIG. 1B), and FIG. 20C is a cross-sectional view of the other inverting portion of the grooves 13 (corresponding to cross-section along line k—k of FIG. 1B). The grooved spacer 11 is a polyethylene extruded body which has a single steel wire tension member 21 at its center and has five SZ-spiral grooves 13 at its outer circumference.

A stack of three optical fiber tapes 15 is accommodated in the no. 1 groove among the five grooves 13, a stack of two optical fiber tapes 15 is accommodated in the no. 2 groove, a single optical fiber tape 15 is accommodated in the no. 3 groove, a stack of two optical fiber tapes 15 is accommodated in the no. 4 groove, and a single optical fiber tape 15 is accommodated in the no. 5 groove, but any number of optical fiber tapes may be stacked and accommodated in the grooves.

The optical fiber tapes 15 are accommodated in the grooves 13 so that the tape surfaces face the groove bottoms at the center portions 19 between inverting portions of the grooves 13 as shown in FIG. 20A and so that the tape side edges face the groove bottoms at the inverting portions 17 as shown in FIG. 20A and FIG. 20C. Note that reference numeral 23 shows a holding tape and reference numeral 25 a sheath.

Prototypes of five types of optical fiber cables shown in Table 6 having the cable structures shown in FIGS. 20A to 20C were prepared.

TABLE 6

| Prototype no. | Dimensions of grooved spacer (mm) | | | | No. of stacked tapes | Excess length rate β (%) | No. of grooves accommodating tapes |
|---|---|---|---|---|---|---|---|
| | O.D. | Groove bottom dia. | Groove width B | Groove depth D | | | |
| 4 | 10.4 | 8.0 | 1.2 | 1.2 | 1 tape/groove | 0.10 | 1, 2, 4 |
| 5 | 10.4 | 8.0 | 1.2 | 1.2 | 1 tape/groove | 0.15 | 1, 2, 4 |
| 6 | 10.9 | 8.0 | 1.4 | 1.4 | 2 tapes/groove | 0.10 | 1, 2, 4 |
| 7 | 11.3 | 8.0 | 1.6 | 1.6 | 2 tapes/groove | 0.15 | 1, 2, 4 |
| 8 | 11.4 | 8.0 | 1.7 | 1.7 | 3 tapes/groove | 0.10 | 1, 2, 4 |

The inverting angles θ of the grooves 13 of the grooved spacers in all cases were about 290° and the inverting pitches P about 250 mm.

The optical fiber tape 15 used, as shown in FIG. 10A, was one comprised of four optical fibers 27 covered by a common coating 29 and had cross-sectional dimensions of a width of 1.1 mm and a thickness of 0.4 mm. The cross-sectional dimensions of a stack of two optical fiber tapes 15 are as illustrated in FIG. 10B, while the cross-sectional dimensions of a stack of three optical fiber tapes 15 are as illustrated in FIG. 10C.

For each of the prototypes of the above five types of optical fiber cables, the transmission loss of the optical fiber tapes 15 was measured at the stage where the optical fiber tapes 15 were accommodated in the grooves of the grooved spacer 11A and a holding tape 23 was applied and the stage where a sheath 25 was applied. The measurement wavelength λ was 1.55 μm. The results are shown in Table 7 to Table 11.

TABLE 7

| Prototype no. | Groove no. | | Stage where holding tape is applied | Stage where sheath is applied |
|---|---|---|---|---|
| 1 | 1 | Average | 0.21 dB/km | 0.22 dB/km |
| 1 tape stacked | | Maximum | 0.21 | 0.23 |
| | | Minimum | 0.20 | 0.21 |
| β = 0.10% | 2 | Average | 0.21 | 0.23 |
| | | Maximum | 0.22 | 0.24 |
| | | Minimum | 0.20 | 0.21 |
| | 4 | Average | 0.21 | 0.22 |
| | | Maximum | 0.22 | 0.23 |
| | | Minimum | 0.20 | 0.21 |

TABLE 8

| Prototype no. | Groove no. | | Stage where holding tape is applied | Stage where sheath is applied |
|---|---|---|---|---|
| 1 | 1 | Average | 0.22 dB/km | 0.22 dB/km |
| 1 tape stacked | | Maximum | 0.23 | 0.23 |
| | | Minimum | 0.21 | 0.21 |
| β = 0.15% | 2 | Average | 0.22 | 0.23 |
| | | Maximum | 0.23 | 0.22 |
| | | Minimum | 0.20 | 0.21 |
| | 4 | Average | 0.23 | 0.23 |
| | | Maximum | 0.24 | 0.24 |
| | | Minimum | 0.21 | 0.21 |

TABLE 9

| Prototype no. | Groove no. | | Stage where holding tape is applied | Stage where sheath is applied |
|---|---|---|---|---|
| 6 | 1 | Average | 0.23 dB/km | 0.22 dB/km |
| 2 tape stacked | | Maximum | 0.23 | 0.23 |
| | | Minimum | 0.22 | 0.21 |
| β = 0.10% | 2 | Average | 0.21 | 0.22 |
| | | Maximum | 0.21 | 0.23 |
| | | Minimum | 0.20 | 0.21 |
| | 4 | Average | 0.21 | 0.22 |
| | | Maximum | 0.22 | 0.23 |
| | | Minimum | 0.20 | 0.20 |

TABLE 10

| Prototype no. | Groove no. | | Stage where holding tape is applied | Stage where sheath is applied |
|---|---|---|---|---|
| 7 | 1 | Average | 0.21 dB/km | 0.23 dB/km |
| 2 tapes stacked | | Maximum | 0.22 | 0.23 |
| | | Minimum | 0.20 | 0.22 |
| β = 0.15% | 2 | Average | 0.21 | 0.23 |
| | | Maximum | 0.22 | 0.24 |
| | | Minimum | 0.20 | 0.21 |
| | 4 | Average | 0.22 | 0.22 |
| | | Maximum | 0.22 | 0.23 |
| | | Minimum | 0.21 | 0.21 |

TABLE 11

| Prototype no. | Groove no. | | Stage where holding tape is applied | Stage where sheath is applied |
|---|---|---|---|---|
| 8 | 1 | Average | 0.21 dB/km | 0.22 dB/km |
| 3 tapes stacked | | Maximum | 0.21 | 0.23 |
| | | Minimum | 0.20 | 0.21 |
| β = 0.10% | 2 | Average | 0.21 | 0.22 |
| | | Maximum | 0.21 | 0.22 |
| | | Minimum | 0.20 | 0.21 |
| | 4 | Average | 0.22 | 0.22 |
| | | Maximum | 0.22 | 0.23 |
| | | Minimum | 0.21 | 0.21 |

The target value of the transmission loss is not more than an average 0.25 db/km, so the cables were confirmed to have sufficient performance.

Examples of Prototypes of Seventh Embodiment

Next, prototypes of the two types of optical fiber cables shown in Table 12 having the cable structures shown in FIG. 20A to FIG. 20C were made.

TABLE 12

| Prototype no. | Dimensions of grooved spacer (mm) | | | | Excess length rate β (%) | No. of stacked tapes | No. of storing grooves |
| --- | --- | --- | --- | --- | --- | --- | --- |
| | O.D. | Groove bottom dia. | Groove width B | Groove depth D | | | |
| 9 | 10.8 | 8.0 | 2.0 | 1.4 | 0.15 | 1 tape/groove | 1 and 3 |
| 10 | 10.8 | 8.0 | 2.0 | 1.4 | 0.10 | 1 tape/groove | 1 and 3 |
| | | | | | | 2 tapes/groove | 2 and 4 |

The inverting angles θ of the grooves 13 of the grooved spacers in all cases were about 290° and the inverting pitches P about 250 mm.

The optical fiber tape 15 used was as shown in FIG. 10A and FIG. 10B.

The groove widths B of the SZ-spiral grooves 13 of the optical fiber cable of this embodiment were made larger than in the above embodiments because use was made of guides for inserting the optical fiber tapes 15 into the SZ-spiral grooves 13 to raise the speed of insertion of the optical fiber tapes into the SZ-spiral grooves 13 of the grooved spacers 11.

For each of the prototypes of the above two types of optical fiber cables, the transmission loss of the optical fiber tapes 15 was measured at the stage where the optical fiber tapes were accommodated in the grooves of the grooved spacer and a holding tape 23 was applied and the stage where a sheath 25 was applied. The measurement wavelength λ was 1.55 μm. The results are shown in Table 13 to Table 14.

TABLE 13

| Prototype no. | Groove no. | | Stage where holding tape is applied | Stage where sheath is applied |
| --- | --- | --- | --- | --- |
| 9 | 1 | Average | 0.21 dB/km | 0.22 dB/km |
| 1 tape stacked | | Maximum | 0.22 | 0.23 |
| | | Minimum | 0.20 | 0.21 |
| β = 0.10% | 3 | Average | 0.21 | 0.22 |
| | | Maximum | 0.22 | 0.22 |
| | | Minimum | 0.20 | 0.21 |

TABLE 14

| Prototype no. | Groove no. | | Stage where holding tape is applied | Stage where sheath is applied |
| --- | --- | --- | --- | --- |
| 10 | 1 | Average | 0.22 dB/km | 0.23 dB/km |
| 1 tape stacked | | Maximum | 0.22 | 0.24 |
| | | Minimum | 0.21 | 0.21 |
| β = 0.10% | 3 | Average | 0.21 | 0.22 |
| | | Maximum | 0.21 | 0.22 |
| | | Minimum | 0.20 | 0.21 |
| 10 | 2 | Average | 0.22 | 0.23 |
| 2 tapes stacked | | Maximum | 0.23 | 0.23 |
| | | Minimum | 0.21 | 0.22 |
| β = 0.10% | 4 | Average | 0.22 | 0.22 |
| | | Maximum | 0.23 | 0.22 |
| | | Minimum | 0.20 | 0.21 |

The target value of the transmission loss is not more than an average 0.25 dB/km, so the cables were confirmed to have sufficient performance.

Eight Embodiment

FIG. 21 to FIG. 24 show examples of an eight embodiment in the case where the optical fiber cable of the present invention is constituted as a self-supporting type cable for aerial use.

Figure 21:
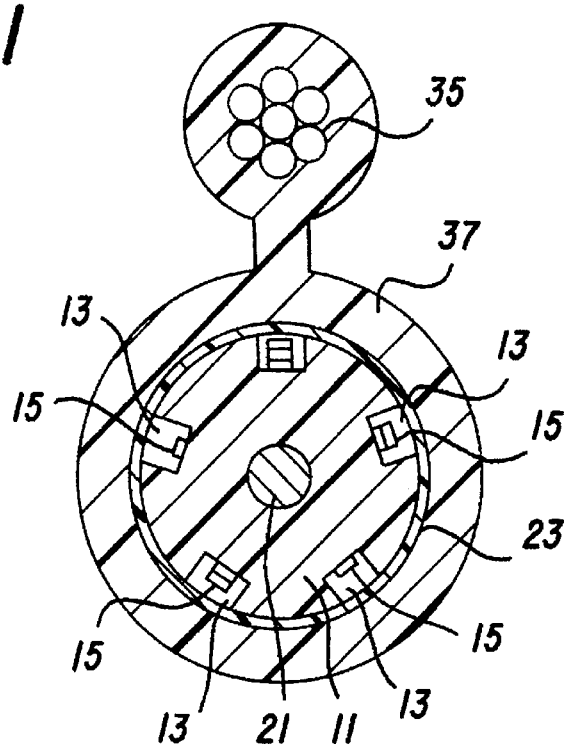
FIG. 21 is a cross-sectional view of a self-supporting type optical fiber cable according to an example of an eighth embodiment of the present invention.

The example shown in FIG. 21 is a self-supporting type cable made by aligning a supporting line 35 with the optical fiber cable of FIG. 20A to FIG. 20C with the holding tape 23 on it, then applying a substantially figure eight cross-sectional common coating 37.

Figure 22:
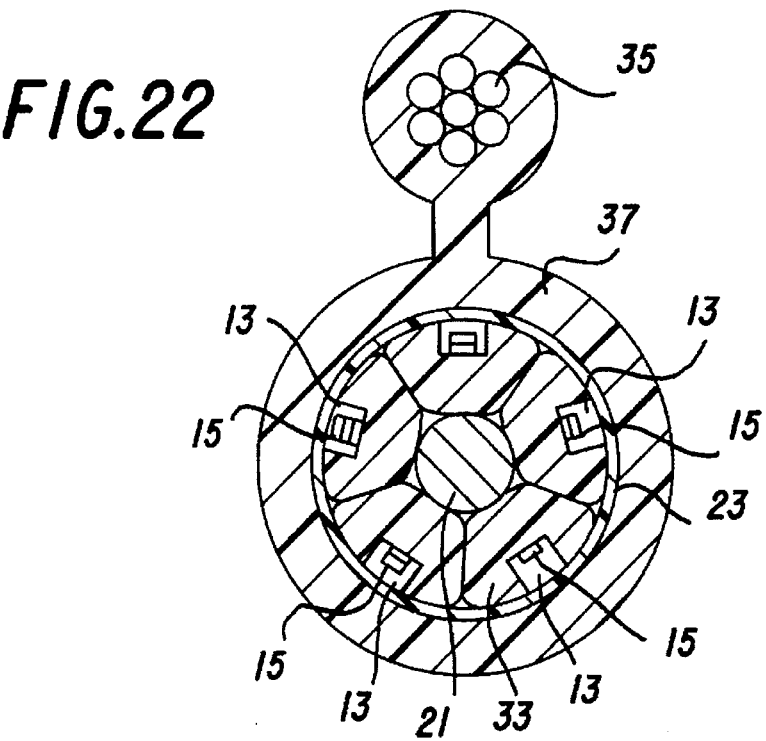
FIG. 22 is a cross-sectional view of a self-supporting type optical fiber cable according to an example of the ninth embodiment of the present invention.

The example of FIG. 22 is a self-supporting type cable made by aligning a supporting line 35 with the optical fiber cable of FIG. 15 with the holding tape 23 on it, then applying a substantially figure eight cross-sectional common coating 37.

Figure 23:
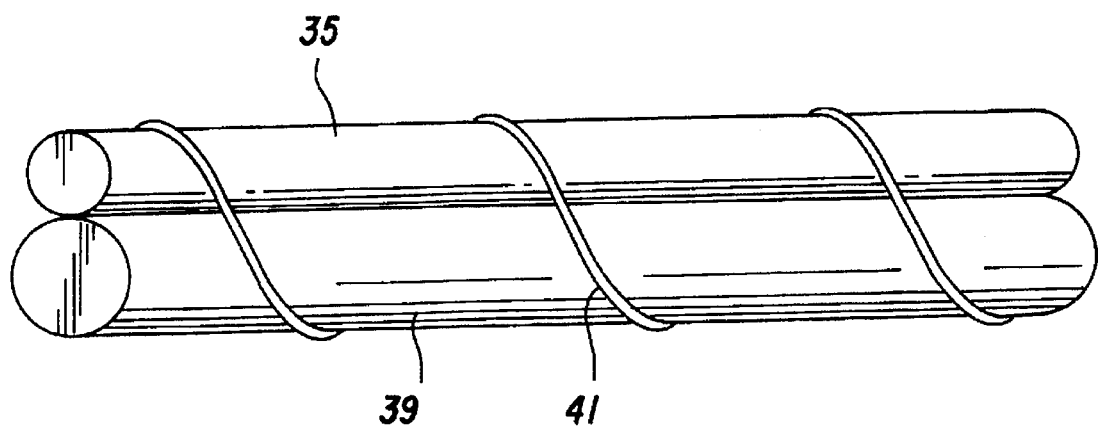
FIG. 23 is a cross-sectional view of a self-supporting type optical fiber cable according to an example of the tenth embodiment of the present invention.

The example of FIG. 23 is a self-supporting type cable made by aligning the support line 35 shown in FIG. 21 or FIG. 22 with the optical fiber cable 39 shown in FIGS. 9A and 89, FIGS. 11A and 11B, FIGS. 12A and 12B, FIGS. 13A and 13B, FIG. 15, FIGS. 16A to 15C, FIGS. 17A to 17C, FIGS. 19A and 19B, or FIGS. 20A to 20C, then wrapping them around with a wrapping wire 41.

Figure 24:
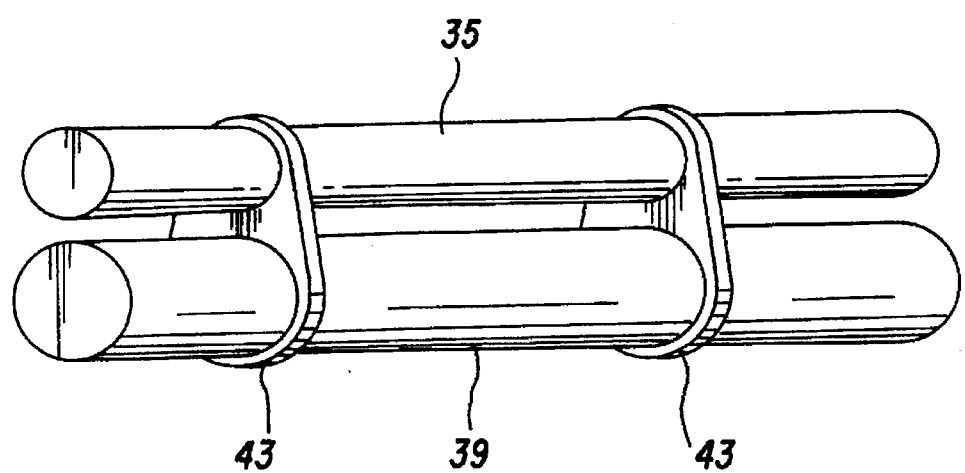
FIG. 24 is a cross-sectional view of a self-supporting type optical fiber cable according to an example of the eleventh embodiment of the present invention.

The example of FIG. 24 is a self-supporting type cable made by aligning the support line 35 shown in FIG. 21 or FIG. 22 with the optical fiber cable 39 shown in FIGS. 9A and 9B, FIGS. 11A and 11B, FIGS. 12A and 12B, FIGS. 13A and 13B, FIG. 15, FIGS. 16A to 16C, FIGS. 17A to 17C, FIGS. 19A and 19B, or FIGS. 20A to 20C, then joining them by molded members 43 provided at predetermined intervals.

Note that in the above embodiments, use was made of grooved-spacers with a plurality of grooves, but the grooved spacer used in the present invention is not limited in the number of grooves and, for example, may have only one groove.

Further, the stacks of the optical fiber tapes accommodated in the grooves of the grooved spacer are not constrained together, so the stacked state may sometimes become a bit uneven.

As explained above, according to the present invention, it is possible to reduce the torsion applied to the optical fiber tapes and the flexing mainly in the direction causing the tape side edges to bend in the tape plane and possible to give an excess length to the optical fiber tapes, so it is possible to suppress the transmission loss of the optical fiber tapes to a sufficiently small level. Accordingly, the present invention contributes greatly to the commercial application of optical fiber cables of this type.

We claim:

1. An optical fiber cable comprising a grooved spacer having on its outer circumference at least one SZ-spiral groove formed continuously along its longitudinal direction and at least one optical fiber tape accommodated in the groove of said grooved spacer, wherein said groove has an inverting angle of at least 180° showing the rotational angle in the circumferential direction of said grooved spacer from one inverting portion of said SZ-spiral groove of said grooved spacer to the next inverting portion and said optical fiber tape is accommodated in said groove in a state where the tape surface faces the bottom of said SZ-spiral groove at the center portions between inverting portions of said SZ-spiral groove and in a state where the tape side edges, which would be positioned at the inside of the bends of said groove of the inverting portions when assuming that said optical fiber tape were accommodated in said groove in a state where the tape surface faced the groove bottom at the inverting portions of the groove, face the groove bottom.

2. An optical fiber cable as set forth in claim 1, wherein the inverting angle of said SZ-spiral groove is in a range from 180° to 360°.

3. An optical fiber cable as set forth in claim 1, wherein when a plurality of optical fiber tapes are accommodated in a single SZ-spiral groove, the plurality of optical fiber tapes are accommodated in a stacked state, are stacked in the depth direction of the groove at the center portions between inverting portions of the SZ-spiral groove, and are stacked in the width direction of the groove at the inverting portions of the groove.

4. An optical fiber cable as set forth in claim 3, wherein the dimensions of said SZ-spiral groove of said grooved spacer are such that the circle circumscribing the cross-section of the stack of optical fiber tapes is accommodated in the groove.

5. An optical fiber cable as set forth in claim 4, wherein when the width of said optical fiber tapes is W, the thickness is T, and the number of tapes stacked is N, the diameter E of the inscribed circle of the groove of said grooved spacer and the depth D of said groove satisfy the following formula:

$$D \geq E \geq \{W^2 + (NT)^2\}^{1/2}$$

6. An optical fiber cable as set forth in claim 4, wherein said SZ-spiral groove of said grooved spacer is rectangular in cross-sectional shape and when the width of said optical fiber tapes is W, the thickness is T, and the number of tapes stacked is N, the width B and the depth D of the SZ-spiral groove of the grooved spacer satisfy the following formula:

$$D \geq B \geq \{W^2 + (NT)^2\}^{1/2}$$

7. An optical fiber cable as set forth in claim 1, wherein an optical fiber tape has at least four optical fibers.

8. An optical fiber cable as set forth in claim 1, wherein said optical fiber tape is accommodated in said SZ-sprial groove with an excess length.

9. An optical fiber cable as set forth in claim 8, wherein when a plurality of optical fiber tapes are accommodated in a single SZ-spiral groove, the plurality of optical fiber tapes are accommodated in a stacked state, are stacked in the depth direction of the groove at the center portions between inverting portions of the SZ-spriral groove, and are stacked in the width direction of the groove at the inverting portions of the groove.

10. An optical fiber cable as set forth in claim 4, wherein when the width of the optical fiber tapes is W, the thickness is T, and the number of tapes stacked in N, the cross-sectional dimensions of the SZ-spiral groove of the grooved spacer are such that the diameter E of the inscribed circle of the groove and the depth D of the groove satisfy the following formula:

$$D \geq E \geq [W^2 + (NT)^2]^{1/2}$$

and when the excess length rate β of the optical fiber tapes is defined by the following formula:

$$\beta = \{(L-L_0)/L_0\} \times 100(\%)$$

where, $L_0$: length of groove of grooved spacer

L: length of optical fiber tapes accommodated in groove the diameter E of the inscribed circle of the groove and the depth D of the groove satisfy the following formula:

$$D \geq E \geq \{(\beta+0.1)^2/0.08\} + NT$$

11. An optical fiber cable as set forth in claim 4, wherein when the width of the optical fiber tapes is W, the thickness is T, and the number of tapes stacked is N, the width B and the depth D of the groove of the grooved spacer satisfy the following formula:

$$D \geq B \geq \{W^2 + (NT)^2\}^{1/2}$$

and when the excess length rate β of the optical fiber tapes is defined by the following formula:

$$\beta = \{(L-L_0)/L_0\} \times 100(\%)$$

where, $L_0$: length of groove of grooved spacer

L: length of optical fiber tapes accommodated in groove the width B of the groove and the depth D of the groove satisfy the following formula:

$$D \geq B \geq \{(\beta+0.1)^2/0.08\} + NT$$

12. An optical fiber cable as set forth in claim 11, wherein the cross-section of said SZ-spiral groove grows larger from the groove bottom of the width to the opening.

13. An optical fiber cable as set forth in claim 1, wherein said grooved spacer is comprised of a single spacer with the SZ-spiral groove formed directly on it along the longitudinal direction of said optical fiber cable.

14. An optical fiber cable as set forth in claim 1, wherein said grooved spacer is comprised of a plurality of grooved segments twisted around a tension member by an SZ-twist.

15. An optical fiber cable as set forth in claim 1, wherein said optical fiber tape is accommodated in some SZ-spiral grooves and single optical fiber is accommodated and jelly filled in other SZ-spiral grooves.

16. An optical fiber cable as set forth in claim 1, wherein said optical fiber tape is accommodated in said SZ-spiral groove supported by a buffer member.

17. An optical fiber cable as set forth in claim 1, wherein said optical fiber tape is accommodated and jelly filled in said SZ-spiral groove.

18. An optical fiber cable as set forth in claim 1, wherein said grooved spacer is supported by a supporting wire provided therealong.

* * * * *